US012631738B2

(12) United States Patent
Mauritz et al.

(10) Patent No.: US 12,631,738 B2
(45) Date of Patent: May 19, 2026

(54) MULTI-SITE RANGE RATE MEASUREMENT COMPILATION IN A WIRELESS COMMUNICATION SYSTEM

(71) Applicant: Telefonaktiebolaget LM Ericsson (publ), Stockholm (SE)

(72) Inventors: Oskar Mauritz, Johanneshov (SE); Sholeh Yasini, Sundbyberg (SE); Torbjörn Wigren, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 608 days.

(21) Appl. No.: 17/761,325

(22) PCT Filed: Sep. 19, 2019

(86) PCT No.: PCT/SE2019/050884
§ 371 (c)(1),
(2) Date: Mar. 17, 2022

(87) PCT Pub. No.: WO2021/054873
PCT Pub. Date: Mar. 25, 2021

(65) Prior Publication Data
US 2022/0357439 A1    Nov. 10, 2022

(51) Int. Cl.
*G01S 11/10* (2006.01)
*G01S 5/00* (2006.01)
(Continued)

(52) U.S. Cl.
CPC ............. *G01S 11/10* (2013.01); *G01S 5/0081* (2013.01); *G01S 5/0294* (2013.01); *G01S 5/14* (2013.01)

(58) Field of Classification Search
CPC ........... G01S 11/10; G01S 11/02; G01S 11/00
See application file for complete search history.

(56) References Cited

U.S. PATENT DOCUMENTS

| | | | | |
|---|---|---|---|---|
| 6,445,344 B1 * | 9/2002 | Wise | ...................... | G01S 5/0072 |
| | | | | 342/450 |
| 11,747,459 B2 * | 9/2023 | Klar | ...................... | G01S 7/0235 |
| | | | | 342/59 |

(Continued)

FOREIGN PATENT DOCUMENTS

| | | |
|---|---|---|
| CN | 103384990 A | 11/2013 |
| CN | 110089140 A | 8/2019 |
| EP | 2323441 A1 | 5/2021 |

OTHER PUBLICATIONS

Schmidl, et al., "Robust Frequency and Timing Synchronization for OFDM," IEEE Transactions on Communications, vol. 45, Issue 12, Dec. 1997, pp. 1613-1621.

(Continued)

*Primary Examiner* — Diana J. Cheng
(74) *Attorney, Agent, or Firm* — Withrow & Terranova, PLLC

(57) ABSTRACT

A method for providing motion information of a UE in a wireless communication system. The method comprises initiating, in a first network node, of a first Doppler shift measurement concerning the UE. In the first network node, a transfer of requests for second Doppler shift measurement concerning the UE is initiated to second network nodes. Data representing the first Doppler shift measurement is obtained in the first network node. Data representing the second Doppler shift measurements is obtained in the first network node. An estimated motion, in more than one dimension, of the UE is determined in dependence of at least the obtained data representing the first Doppler shift measurement and the obtained data representing the second Doppler shift measurements. A method for assisting by the second network node, as well as network nodes performing the methods are also disclosed.

17 Claims, 11 Drawing Sheets

(51) Int. Cl.
   G01S 5/02          (2010.01)
   G01S 5/14          (2006.01)

(56)                    References Cited

U.S. PATENT DOCUMENTS

| | | |
|---|---|---|
| 2014/0281351 A1 | 9/2014 | Topp et al. |
| 2016/0050604 A1 | 2/2016 | Lee et al. |
| 2016/0055088 A1 | 2/2016 | Zhang et al. |
| 2018/0206075 A1 | 7/2018 | Demirdag et al. |

OTHER PUBLICATIONS

Wigren, "Wireless Hybrid Positioning Based on Surface Modeling with Polygon Support," 87th Vehicular Technology Conference, Jun. 2018, IEEE, 7 pages.

International Search Report and Written Opinion for International Patent Application No. PCT/SE2019/050884, mailed Jun. 25, 2020, 17 pages.

Extended European Search Report for European Patent Application No. 19947869.4, mailed Jun. 12, 2023, 8 pages.

First Office Action for Chinese Patent Application No. 201980100534. 2, mailed Sep. 27, 2024, 51 pages.

Rejection Decision for Chinese Patent Application No. 201980100534. 2, mailed Jan. 23, 2025, 61 pages.

* cited by examiner

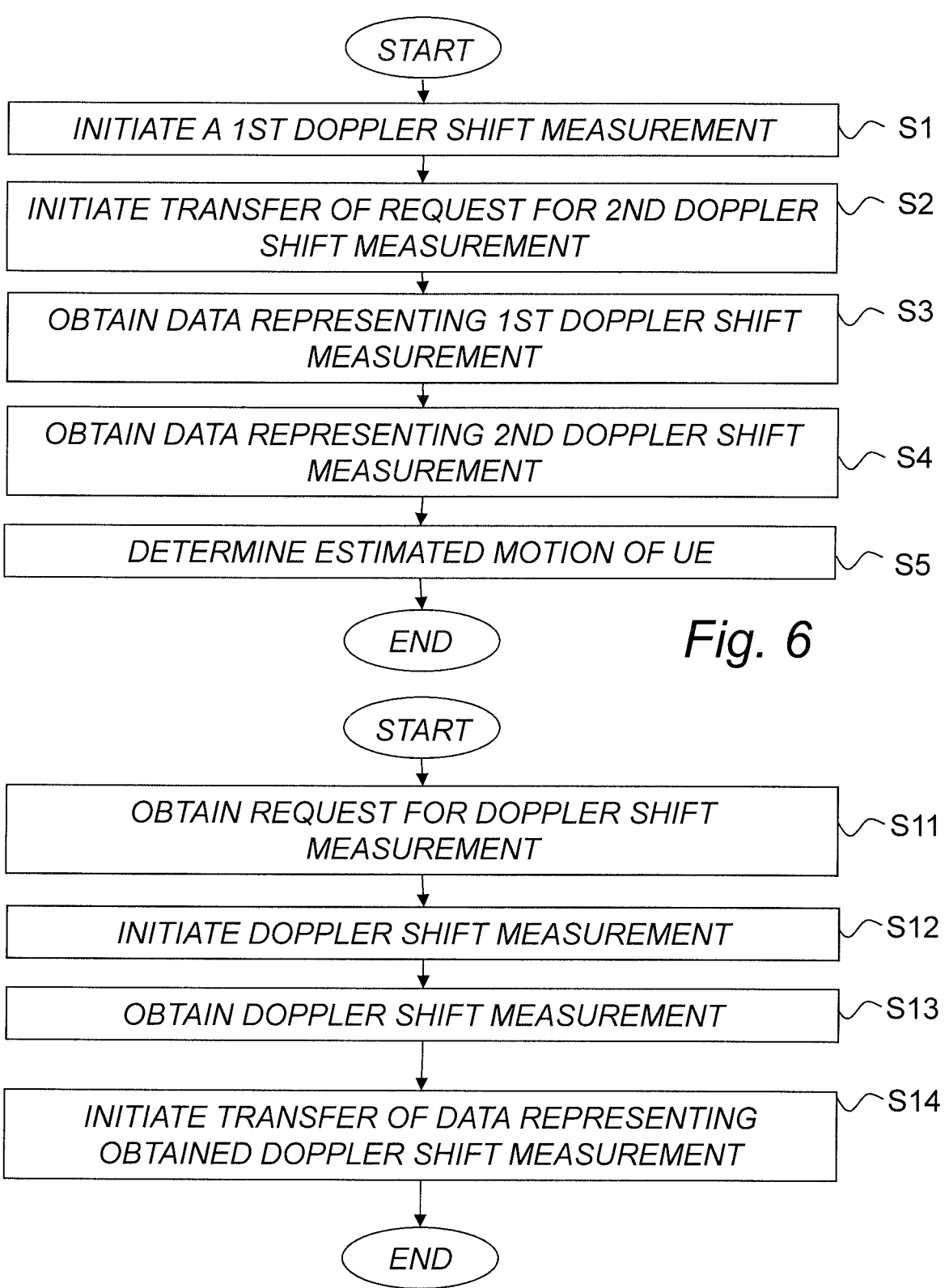

START

INITIATE A 1ST DOPPLER SHIFT MEASUREMENT ⟩∿ S1

INITIATE TRANSFER OF REQUEST FOR 2ND DOPPLER SHIFT MEASUREMENT ⟩∿ S2

OBTAIN DATA REPRESENTING 1ST DOPPLER SHIFT MEASUREMENT ⟩∿ S3

OBTAIN DATA REPRESENTING 2ND DOPPLER SHIFT MEASUREMENT ⟩∿ S4

DETERMINE ESTIMATED MOTION OF UE ⟩∿ S5

END

*Fig. 6*

START

OBTAIN REQUEST FOR DOPPLER SHIFT MEASUREMENT ⟩∿ S11

INITIATE DOPPLER SHIFT MEASUREMENT ⟩∿ S12

OBTAIN DOPPLER SHIFT MEASUREMENT ⟩∿ S13

INITIATE TRANSFER OF DATA REPRESENTING OBTAINED DOPPLER SHIFT MEASUREMENT ⟩∿ S14

END

*Fig. 7*

COMMUNICATION CIRCUITRY

201

PROCESSOR

241

MEMORY

251

NETWORK NODE 30

NETWORK NODE
30

HW CIRCUITRY

INPUT
FROM
MEM/REG

OUTPUT TO
MEM/REG

211

NETWORK NODE/(BASE STATION) 20/(30)

NETWORK DEVICE 40

COMPUTER PROGRAM
<u>230</u>

<u>255</u>

PROCESSOR
<u>241</u>

I/O
<u>204</u>

COMPUTER PROGRAM
<u>231</u>

MEMORY
<u>251</u>

NETWORK NODE    <u>30</u>

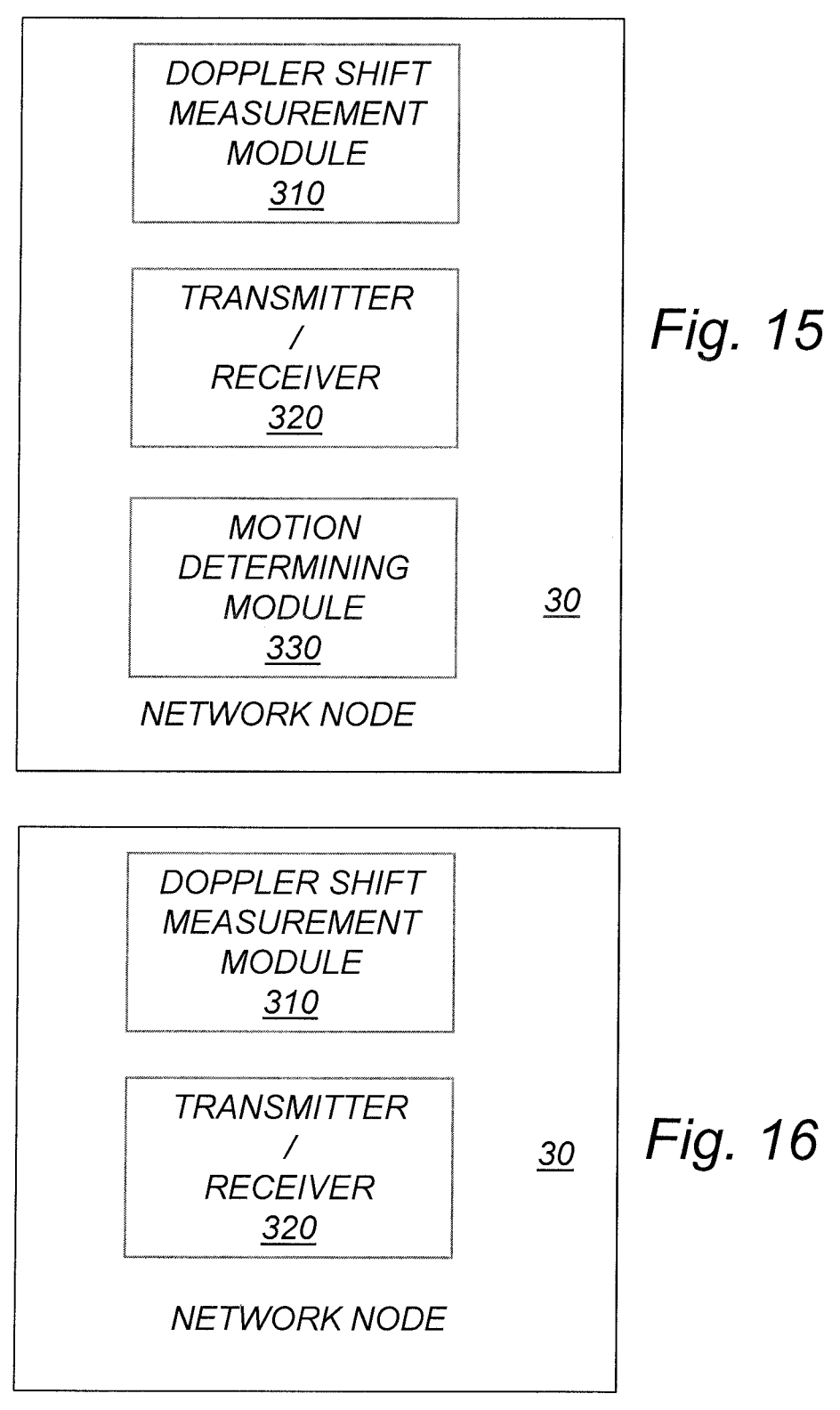

DOPPLER SHIFT
MEASUREMENT
MODULE
310

TRANSMITTER
/
RECEIVER
320

MOTION
DETERMINING
MODULE
330

30

NETWORK NODE

*Fig. 15*

DOPPLER SHIFT
MEASUREMENT
MODULE
310

TRANSMITTER
/
RECEIVER
320

30

NETWORK NODE

*Fig. 16*

MULTI-SITE RANGE RATE MEASUREMENT COMPILATION IN A WIRELESS COMMUNICATION SYSTEM

This application is a 35 U.S.C. § 371 national phase filing of International Application No. PCT/SE2019/050884, filed Sep. 19, 2019, the disclosure of which is incorporated herein by reference in its entirety.

TECHNICAL FIELD

The proposed technology generally relates to provision of motion information of a user equipment in a wireless communication system, and in particular to methods and devices for providing and assisting in providing motion information of a user equipment in a wireless communication system.

BACKGROUND

A User Equipment (UE) connectable to wireless communication networks can today be of very varying kinds. Besides the traditional mobile phones, UEs are today e.g. used for remote machine control, in sensors or other types of data collection devices, and in mobile as well as stationary data communication system. Different characterizing features of the UEs can be utilized in different ways in the different applications. For instance, the mobility is typically crucial in most mobile applications, such as phones, mobile detection systems, or mobile data communication systems. However, the wireless nature of a UE may instead be the main reason for using UEs in stationary applications, such as stationary machine controls, sensors provided in sensitive environments etc.

It is of benefit for the overall utilization of the wireless communication systems if the operator can distinguish between UEs having e.g. different expected motion patterns. Not only the information about if a UE is stationary or not, but also information of the nature of any motion can be useful for different network purposes. In present systems, there are typically different kinds of positioning systems, giving an instantaneous position. However, the ability to also monitoring the motion of the UEs, i.e. the rate of change of the position, is severely limited.

One example of where motion information may be of use is to solve the so-called rogue drone problem. Today, airborne radio-controlled drones are becoming more and more common. These so-called drones have in the past been limited to stay within range of the radio control equipment dedicated to control them.

However, recently functionality allowing drones to be remotely controlled over the cellular network has increased their ranges considerably. This can e.g. be achieved by attaching a Long-Term Evolution (LTE) UE to the drone and by coupling the UE to the navigation system of the drone. This way, the drone is enabled to travel over multiple cells resulting in ranges that is limited only by the battery of the drone. In some markets, this is already being regulated, and UEs attached to drones are registered as such. However, a large number of users fail to register, such users being denoted as "rogue drones".

The LTE, or in the future New Radio (NR), capable drones need to be restricted in terms of their flight. This is particularly the case for rogue drones.

A first reason for this is that rogue drones that transmit and receive cellular radio messages at significant altitudes, tend to create more interference than ground-based UEs, simply because there are less obstacles when the altitude of the drone is significant, propagation can then be close to free-space propagation. The interference therefore reaches further and creates interference problems also in adjacent cells. At higher altitudes, drones may also be served by the sidelobes of radio base station antennas that are down-tilted. This may increase the risk of sudden signal changes.

A second reason is that rogue drones create hazardous situations when flying illegally in certain parts of the airspace. Examples include airports, where commercial air traffic may be at danger, and the airspace over densely populated areas where a crash would be likely to cause human injuries. Note that this is likely to be a major concern for aviation authorities and thereby for cellular operators. On Dec. 20, 2018, Gatwick International Airport, London, UK, had to close for many hours due to rogue drones. Early in 2019, the same situation occurred at Heathrow International Airport, London, UK, and at Newark International airport, NYC. The severity of the problem, and the urgency of developing solutions to counter illegal flight cannot be underestimated.

In order to prevent the problems described above, a way has to be found to identify and locate the drones and in particular the rouge drones. Such solutions are believed to be based typically on the characteristics of the movements of the UEs connected to the drones. Improved measurements and methods for determining or estimation motions of UEs are therefore requested. Such improved measurements and methods can also be utilized in many other applications as well.

SUMMARY

It is an object to provide methods and devices for improved determinations of estimated, preferably three-dimensional, motion of UEs.

This and other objects are met by embodiments of the proposed technology.

According to a first aspect, there is provided a method for providing motion information of a UE in a wireless communication system. The method comprises initiating, in a first network node, of a first Doppler shift measurement concerning the UE. In the first network node, a transfer of requests for second Doppler shift measurement concerning the UE is initiated to at least one second network node. Data representing the first Doppler shift measurement is obtained in the first network node. Data representing the at least one second Doppler shift measurement is obtained in the first network node. An estimated motion, in more than one dimension, of the UE is determined in dependence of at least the obtained data representing the first Doppler shift measurement and the obtained data representing the at least one second Doppler shift measurement.

According to a second aspect, there is provided a method for assisting in providing of motion information of a UE in a wireless communication system. The method comprises obtaining, in a network node, a request for a Doppler shift measurement concerning the UE. The UE is connected to another network node. In the network node, a Doppler shift measurement concerning the UE is initiated according to the request. A Doppler shift measurement made according to the request is obtained in the network node. A transferring of data to the network node initiating the request is initiated. The data represents the obtained Doppler shift measurement.

According to a third aspect, there is provided a network node configured to provide motion information of a UE in a wireless communication system. The network node is configured to initiate a first Doppler shift measurement concerning the UE. The network node is further configured to initiate a transfer of requests for second Doppler shift measurement to at least one second network node concerning the UE. The network node is further configured to obtain data representing the first Doppler shift measurement. The network node is configured to obtain data representing the at least one second Doppler shift measurement. The network node is configured to determine an estimated motion, in more than one dimension, of the UE in dependence of at least the obtained data representing the first Doppler shift measurement and the obtained data representing the at least one second Doppler shift measurement.

According to a fourth aspect, there is provided a network node for assisting in providing of motion information of a UE in a wireless communication system. The network node is configured to obtain a request for a Doppler shift measurement concerning the UE. The UE is connected to a network node different from the network node. The network node is further configured to initiate a Doppler shift measurement concerning the UE according to the request. The network node is further configured to obtain a Doppler shift measurement made according to the request. The network node is further configured to initiate a transferring of data representing the obtained Doppler shift measurement to the network node initiating the request.

According to a fifth aspect, there is provided a computer program comprising instructions, which when executed by at least one processor, cause the processor(s) to initiate a first Doppler shift measurement concerning the UE, to initiate a transfer of requests for second Doppler shift measurement to at least one second network node concerning the UE, to obtain data representing the first Doppler shift measurement, to obtain data representing the at least one second Doppler shift measurement, and to determine an estimated motion, in more than one dimension, of the UE in dependence of at least the obtained data representing the first Doppler shift measurement and the obtained data representing the at least one second Doppler shift measurement.

According to a sixth aspect, there is provided a computer program comprising instructions, which when executed by at least one processor, cause the processor(s) to obtain a request for a Doppler shift measurement concerning the UE, where the UE is connected to a network node different from the network node, to initiate a Doppler shift measurement concerning the UE according to the request, to obtain a Doppler shift measurement made according to the request; and to initiate a transferring of data representing the obtained Doppler shift measurement to the network node initiating the request.

According to a seventh aspect, there is provided a computer-program product comprising a computer-readable medium having stored thereon a computer program of the fifth or sixth aspect.

An advantage of the proposed technology is that it enables improved determinations of estimated, preferably three-dimensional, motions UEs. Other advantages will be appreciated when reading the detailed description.

BRIEF DESCRIPTION OF THE DRAWINGS

The embodiments, together with further objects and advantages thereof, may best be understood by making references to the following description taken together with the accompanying drawings, in which:

FIG. 6 is a schematic flow diagram illustrating steps of an embodiment of a method for providing motion information of a UE in a wireless communication system;

FIG. 7 is a schematic flow diagram illustrating steps of an embodiment of a method for assisting in providing of motion information of a UE in a wireless communication system;

FIG. 15 is a schematic diagram illustrating an embodiment of a network node;

FIG. 16 is a schematic diagram illustrating another embodiment of a network node;

DETAILED DESCRIPTION

Figure 1:
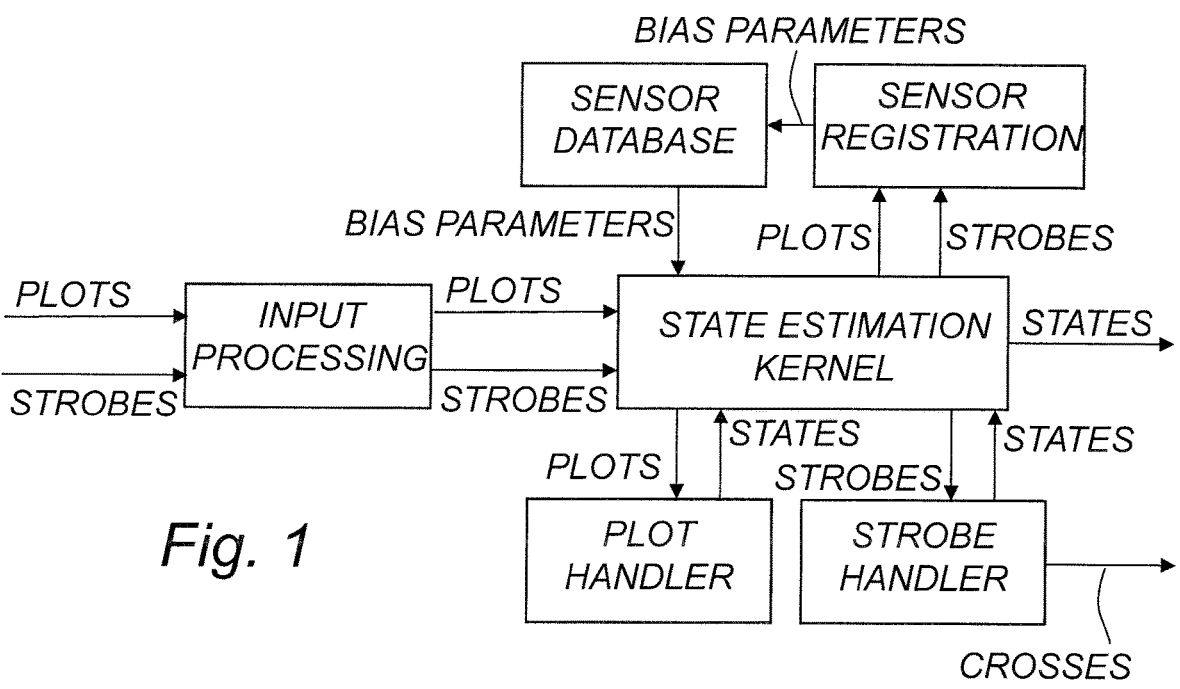
FIG. 1 is an example of a commercial moving object state estimation system.

Throughout the drawings, the same reference designations are used for similar or corresponding elements.

In the present disclosure, the term "base station" is used as a general term defining a node providing user plane and control plane protocol terminations towards a UE and being connected to a core network. Typical, non-exclusive, examples of Node Bs are a node B as specified for a Universal Mobile Telecommunication System (UMTS), "eNodeB", eNB or "Evolved Node B" as specified for LTE, and new radio NodeB (gNB) as specified for NR systems.

For a better understanding of the proposed technology, it may be useful to begin with a brief overview of some general aspects of kinematic state estimation of moving objects and range and range rate measurements.

The technical field of moving object kinematic state estimation is, as such, mature today, with many operational systems worldwide. See for example any of the many available textbooks on the subject. One example of a so-called multi-sensor kinematic state estimation system is described in Appendix A.

To be able to accurately estimate the movement state of a UE, it is first realized that UEs may move in very specific ways. These modes of movement preferably need to be reflected by an optimal estimator applied for measurement processing.

There are many known methods for estimation when multiple dynamic modes describe the behavior of an object, whose state is estimated. Some aspects are presented in Appendices B-D.

A kinematic state estimation procedure is based on a continuous provision of different measurements related to position and/or velocity. Range measurements, i.e. a distance between a measuring position and the object in question, e.g. a UE, are as such readily available within a wireless communication network.

a Note on Discretization

The models discussed in the detailed description are defined in continuous time, using differential equations. For computer implementation, they need to be discretized. Given a continuous time Wiener process:

$$dx = Ax\,dt + B\,dv, \tag{1}$$

it follows that the discrete time state equation after sampling with the period T is:

$$x(k+1) = F_i x(k) + v(k), \tag{2}$$

where $$F_i = e^{A_i T}, \quad i = 1, 2, 3 \tag{3}$$

$$v(k) = \int_0^T e^{A(T-\tau)} B_i \hat{v}(kT + \tau)\,d\tau, \quad i = 1, 2, 3, \tag{4}$$

and with the discretized process noise covariance:

$$Q = \mathbb{E}[v(k)v(k)']. \tag{5}$$

It is assumed below that all continuous time equations are discretized like this before applying the interacting-multiple-model (IMM) filter.

There are several possibilities for range measurement. One way is to perform path-loss measurements. One model for pathloss is described in Appendix F. That is, however, not accurate enough for the present estimation application, to be used without supporting measurements, since the pathloss is affected by radio fading and since range needs to be computed from an assumed radio propagation model.

A better and more accurate basis for measurement of range is to measure the travel time of radio waves from a base station and a UE and back, i.e. a round-trip-time (RTT) measurement. This is briefly described in Appendix E.

The problem with RTT measurements in multiple sites is that this option is not available in LTE. There, only serving cell timing advance (or round-trip time) is available. In case neighbor site round-trip time measurements were used, these would be obtained by listening on the serving cell transmission, a fact that require accurate time synchronization, say better than 10-25 ns. A similar situation restricts NR, but there at least some kind of multi-site round-trip time measurement is discussed. Also, in NR this could end up being dependent on accurate time synchronization.

As a summary, it is a fact that range-only state estimation seems to be feasible in NR only provided that time synchronization is available with an accuracy of about 10-25 ns.

Range-only state estimation is furthermore probably not possible in LTE since the most accurate range related measurement is the round-trip time measurement that is only available for the serving cell in LTE. However, the present technology therefore exploits the possibilities to use additional kinematic measurements in the form of Doppler shift measurements to be used for kinematic state estimation. In case supporting Doppler shift measurements could be made available in LTE and in NR (particularly when no time synchronization is available) the situation would change. That would enable range rate processing in the state estimation algorithm. Therefore, one important part of the present disclosure is to enable eNB/gNB based motion estimation, by providing Doppler shift measurements that at least support the less accurate range measurements.

Figure 5:
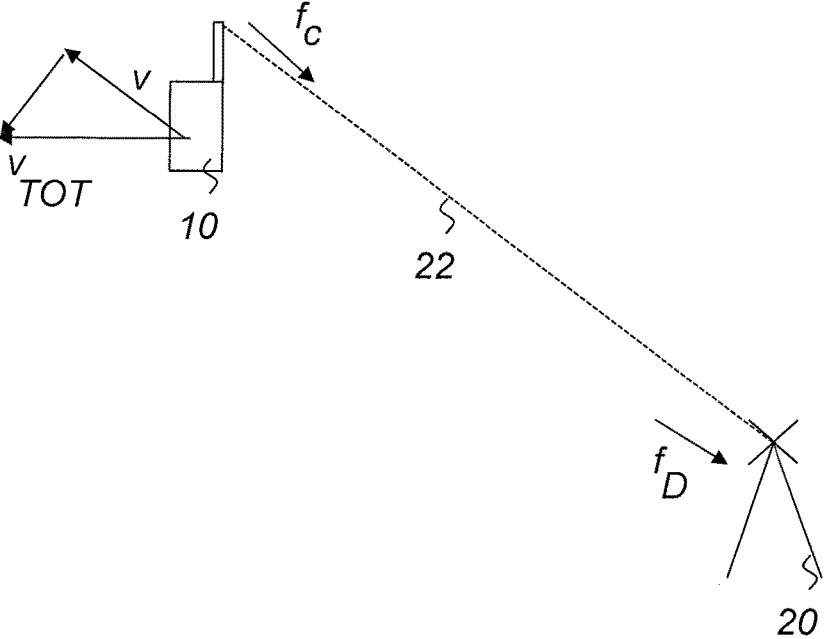
FIG. 5 illustrates the principle of a Doppler shift measurement.

In general, Doppler shift measurements can be made in most wireless systems, at least for the serving cell. Briefly, the Doppler frequency is related to the speed by which a user departs from radio base station as:

$$f_D = \frac{v}{c} f_c, \tag{6}$$

where $f_D$ is the Doppler frequency, v is the departing component velocity of the UE departing from the base station, c is the speed of light and $f_c$ is the carrier frequency. FIG. 5 illustrates the relations. A UE 10 communicates with a base station 20, utilizing a carrier frequency L. The direction of the communication is indicated by the dotted line 22. The UE 10 moves with a total velocity $v_{TOT}$, in the present example slightly away from the base station 20. A velocity component v parallel to the direction between the UE 10 and the base station 20 is illustrated, and in the present example, this velocity component is directed away from the base station 20. The experienced received frequency at the base station 20 will differ by the Doppler frequency $f_D$, and will be influenced by the motion of the UE 10, in an amount depending on the velocity component v. The Doppler frequency according to Eq. (6) assumes that the positive direction of the velocity component v is directed away from the base station. A positive Doppler frequency shift thus corresponds to a UE 10 moving away from the base station 20 and a negative Doppler frequency shift corresponds to a UE 10 moving towards the base station 20. Note that it is only the velocity component in the direction of the base station 20 that gives any Doppler effect. A UE 10 moving perpendicular to such a direction will thus not give rise to any Doppler effect and will give the same frequency as a stationary UE.

Note that this is a convention and a formulation with reversed signs is also possible. The important thing is that the sign of the departing velocity and the Doppler shift are associated with a known sign convention. Physically, it is clear that a departing UE will reduce the actual received frequency, i.e. the physical Doppler shift is negative, however, it is a trivial matter to change the sign of the returned encoded measurement, should that be required according to the convention.

In order to give a possibility for multi-dimensional movement estimation, the Doppler shift measurements are to be performed relative the same UE from at least two sites and preferably from a multitude of sites. This requires communication of measurement results to one single node, preferably the base station to which the UE is connected or a node in communicational connection thereto.

The present technology focuses on measurement methods for range rate, in multiple sites, as well on corresponding signaling solutions, for UE movement estimation, typically in LTE and in NR. Therefore, an idea is to add supporting UL Doppler shift measurements in the serving and neighboring eNBs. These additional measurements would then support any range measurements that may consist of serving cell timing advance (TA) in LTE and NR, as well as neighbor cell path loss in LTE, and neighbor cell pathloss and possibly round-trip time in NR. The idea with the Doppler shift measurement support would be to relax the range measurement accuracy. As long as the range measurements are reasonably unbiased, they thereby provide longer term compensation for the inevitable drift associated with any rate measurement principle. This solution requires that Doppler shift measurements can be signaled between eNBs, something that is also disclosed here.

In summary, the novel kinematic state estimation techniques discussed here are therefore mainly related to the measurement techniques to obtain in particular range rates with respect to multiple base stations, together with the signaling applied to obtain a UE kinematic state estimation system using the available information.

FIG. 6 is a schematic flow diagram illustrating steps of an embodiment of a method for providing motion information of a UE in a wireless communication system. In step S1, in a first network node, a first Doppler shift measurement concerning the UE is initiated. This first Doppler shift measurement is intended to measure the range rate between the network node, typically a base station, or the site from where the transmission and reception is made, and the UE. This gives information about the velocity component of the UE in a direction away from the network node.

In step S2, in the first network node, a transfer of requests for second Doppler shift measurement to at least one second network node concerning the UE is initiated. These second Doppler shift measurements are intended to measure the ranges rate between these other network nodes, typically base stations, and the UE. This gives information about the velocity component of the UE in directions away from the other network nodes, i.e. typically in other directions compared to the first Doppler shift measurement. The requests are transferred to the different second network nodes to inform about e.g. the identity of the UE and about when there are available uplink signaling to measure on, as specified in the time and frequency domains.

In step S3, in the first network node, data representing the first Doppler shift measurement is obtained. In step S4, in the first network node, data representing the at least one second Doppler shift measurement is obtained. The first network node now has the collective information about Doppler shifts from a multitude of network nodes at different positions relative the UE.

In step S5, an estimated motion, in more than one dimension, of the UE is determined in dependence of at least the obtained data representing the first Doppler shift measurement and the obtained data representing the at least one second Doppler shift measurement. As will be described further below, this estimation is typically and preferably performed in cooperation with different range measurements. The determining of an estimated motion preferably comprises estimation of a kinematic state of the UE.

This is the basic procedure at the network node, typically a base station, performing the estimation. However, the other, "second", network nodes also have to be active.

FIG. 7 is a schematic flow diagram illustrating steps of an embodiment of a method for assisting in providing of motion information of a UE in a wireless communication system. In step S11, in a network node, a request for a Doppler shift measurement concerning the UE is obtained. The UE is connected to another network node, typically to the network node from which the request was issued. As a response to the request, in step S12, in the network node, a Doppler shift measurement concerning the UE and according to the request is initiated. In step S13, in the network node, a Doppler shift measurement made according to the request is obtained. Finally, in step S14, a transferring to the network node initiating the request of data representing the obtained Doppler shift measurement is initiated.

As anyone skilled in the art understands, the network node to which the UE is connected acts as a "master" node, which gives orders to the "slave" nodes to perform and provide Doppler shift measurements. This also means that a particular network node may operate as a "master" node in relation to one UE, but as a "slave" node concerning another UE. The two procedures of FIG. 6 and FIG. 7 may therefore be performed in one and the same node. The methods may even be performed simultaneous, but then in relation to different UEs.

Figure 8:
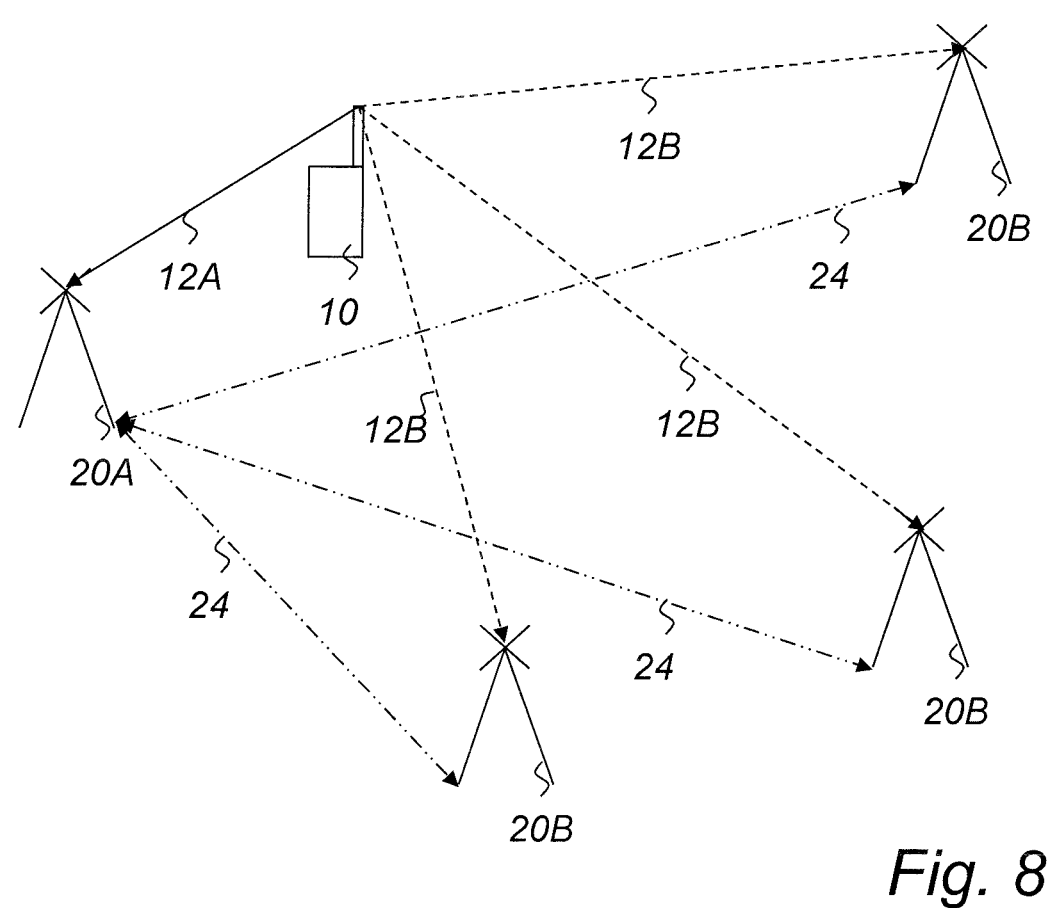
FIG. 8 is a schematic illustration of measurements and signaling of Doppler shifts in a communication system.

FIG. 8 illustrates schematically the relation between the different base stations. The UE 10 is connected to a first base station 20A and transmits uplink signals 12A thereto. These uplink signals are also detectable as interference signals 12B at neighboring base stations 20B, even if they are not the base stations serving the UE 10. However, these interference signals 12B can still be detected and a Doppler shift measurement can be performed. The serving base station 20A and the neighboring base stations 20B communicate 24 with each other. As indicated above, a request for Doppler shift measurements is sent from the serving base station 20A to the neighboring base stations 20B and the results of the measurements are sent back to the serving base station 20A.

If the UE 10 moves and performs a handover to another of the base stations 20B, the situation changes and the new serving base station takes over the role of issuing relevant requests.

Some general aspects of Doppler shift measurement can be given. The Doppler shift due to the movement of a UE manifests itself as a frequency offset in the received uplink signals. A signal that reaches the base station as x(t) without frequency offset is instead received as $e^{i2\pi f_D t}x(t)$ with frequency offset $f_D$., cf. the comment on convention above. There are several ways to estimate the frequency offset in an OFDM system. In "Robust frequency and timing synchronization for OFDM" by T. M. Schmidl, D. C. Cox, in *IEEE Trans. Wirel. Commun., vol.* 45, no. 12, pp. 1613-1621, 1997, ref [2], two identical parts of the transmitted signal are correlated and the phase change between the two received parts is used to estimate the frequency offset.

It is also possible to consider the frequency offset to be part of the propagation channel, h(t; τ) where t is the time and τ is the delay. Then, the impact of the frequency is that h(t; τ) is replaced by $e^{i2\pi f_D t}h(t;\tau)$.

Several uplink signals are possible to use for the frequency offset estimation. Non-exclusive examples are: Physical Uplink Control Channel (PUCCH) and Physical Uplink Control Channel (PUSCH) as well as Sounding Reference Signal (SRS). Whereas PUCCH and SRS can be sent without dynamic scheduling PUSCH offers the possibility to vary the received energy to obtain the required energy for acceptable estimation accuracy of $\varphi_i$ and hence of $f_D$, as will be discussed more in detail further below. Although the signal transmitted from the UE is intended for a single cell, the serving cell, the signal is typically possible to receive in other cells as well and therefore allows for multi-base station Doppler shift measurement.

In certain applications, e.g. for flying drones, the channel is typically non-dispersive and can therefore preferably be described as h(t). Estimating the channel at time $t_1$ and $t_2$ and neglecting other effects on the channel the frequency offset is calculated as follows:

Let $\varphi_i = \angle h(t_i)$ and let '^' denote estimate. Then the frequency offset f is estimated using two channel estimates for two different reference signals, e.g. on PUSCH as:

$$\hat{f} = \frac{\hat{\varphi}_2 - \hat{\varphi}_1}{2\pi\Delta T}, \qquad (7)$$

where $\Delta T = t_2 - t_1$ is the time difference between the two channel estimates. The estimation accuracy depends on both the accuracy of $\hat{\varphi}_i$ and $\Delta T$:

$$\sigma_f^2 = \frac{2\sigma_\varphi^2}{(2\pi\Delta T)^2}, \qquad (8)$$

where $$\sigma_f^2$$

and $$\sigma_\varphi^2$$

are the variances for the frequency offset estimate $\hat{f}$ and for the phase estimate $\hat{\varphi}$, respectively. The variance $$\sigma_\varphi^2$$

decreases with increasing signal-to-noise ratio.

As mentioned above, the signal transmitted from the UE is intended for a single cell, the serving cell. It was here above considered that the signal anyway is typically possible to receive in other cells as well and therefore allows for multi-base station Doppler shift measurement. However, in a general case, the signal-to-noise ratio of such eavesdropping signals may not be very good. Since the variance of the Doppler shift scales with the variance of the phase estimate, which in turn increases with decreasing signal-to-noise ratio, the accuracy of the Doppler shift measurements based on standard uplink signaling may in some situations be quite low.

Therefore, in preferred embodiments, there are measures taken aiming at increasing the signal-to-noise ratio of the uplink signaling as detected by the neighboring base stations.

In one embodiment, multi-site signal sensitivity is compensated by increasing the number of used physical resource blocks (PRBs).

UE Transmission power control aims to reach a power target per resource block of the received signal in the serving cell. The power target is set to obtain sufficiently high signal-to-noise ratio in the receiver for data transmission while avoiding excessive interference in neighboring cells. The received signal is typically lower in the neighboring cells than in the serving cell and therefore may be too weak to give required frequency offset estimation accuracy. One way to increase the received signal energy is to increase the number of scheduled resource blocks, e.g. for PUSCH. Since the total power is proportional to the number of resource blocks granted, the power increases with the resource block allocation as long as the UE is not power-limited.

In other words, in one embodiment, in the serving base station, the method for providing motion information of a UE in a wireless communication system further comprises initiating of an increased number of scheduled resource blocks for uplink signaling from the UE. Thereby, the requests to the neighboring base stations comprise a request to measure over the increased number of resource blocks for uplink signaling from the UE. Preferably, the scheduled resource blocks for uplink signaling from the UE are resource blocks for PUSCH.

Also, in one embodiment, in a base station, in the method for assisting in providing of motion information of a UE in a wireless communication system, the request comprises a request to measure over an increased number of resource blocks for uplink signaling from the UE. Thereby, the initiating of a Doppler shift measurement comprises initiating of a Doppler shift measurement over the increased number of scheduled resource blocks for uplink signaling from the UE. Preferably, the scheduled resource blocks for uplink signaling from the UE are resource blocks for PUSCH.

Another way to increase the received energy and hence the estimation accuracy is to grant the UE uplink transmissions in several subframes and average the frequency offset estimates. For example, averaging may be performed with a one-tap Infinite Impulse Response (IIR) filter:

$$\bar{f}_n = \alpha \hat{f}_n + (1-\alpha)\bar{f}_{n-1}, \qquad (9)$$

where $\hat{f}_n$ and $\bar{f}_n$ are the nth sample of the unfiltered and filtered frequency offset estimates, respectively, and a is a constant, $0 < \alpha < 1$. Here the subscript n relates to the time domain.

In other words, in one embodiment, in the serving base station, the method for providing motion information of a UE in a wireless communication system further comprises initiating of a scheduling of resource blocks for uplink signaling from the UE in several subframes. The requests comprise a request to measure over the resource blocks for uplink signaling from the UE in the several subframes and to average the measurements.

Also, in one embodiment, in a base station, in the method for assisting in providing of motion information of a UE in a wireless communication system, the request comprises a request to measure over resource blocks for uplink signaling from the UE in several subframes and to average the measurements. The initiating of a Doppler shift measurement comprises initiating of a Doppler shift measurement over the resource blocks for uplink signaling from the UE in several subframes. The method for assisting in providing of motion information of a UE in a wireless communication system comprises the further step of averaging obtained Doppler shift measurements made over the resource blocks for uplink signaling from the UE in several subframes.

The above-mentioned measures are taken in order to improve the signal-to-noise ratio during the Doppler measurements. However, these improvements in signal-to-noise ratio have some minor drawbacks in increased general interference and increased utilization of resource blocks. It may therefore in a preferred embodiment be useful to have some knowledge of the actual signal-to-noise ratio in the measurements. In other words, in one embodiment, in the serving base station, the method for providing motion information of a UE in a wireless communication system further comprises obtaining a signal-to-noise ratio for uplink signaling from the UE as measured by the at least one second base station. The initiating of an increased number of scheduled resource blocks for uplink signaling from the UE or the initiating of a scheduling of resource blocks for uplink signaling from the UE in several subframes is then performed in dependence of the signal-to-noise ratio.

The signal-to-noise ratio can be explicitly signaled, preferably in connection of a report of a Doppler shift measurement. Alternatively, the accuracy of the Doppler shift measurement can be evaluated and an estimate of the prevailing signal-to-noise ratio can be computed.

The UEs are instructed by the communication network to transmit at certain well-defined frequencies. However, in some cases, there might be a slight offset in the frequency that a UE utilizes, compared to the nominal one. This may e.g. depend on incompletenesses in the Radio Frequency (RF) parts of the UE, errors in frequency calibration routines or drifts in the UE electronics. Such a frequency offset will appear as a "velocity" in the Doppler shift measurements and may in different degrees influence the estimation of the UE movement. Therefore, in a preferred embodiment, the determining of an estimated motion of the UE comprises a UE frequency offset compensation.

There are some different approaches to such compensation. One alternative is UE frequency offset compensation by state vector augmentation. In such an approach, the UE bias can be thought of as an additional state that needs to be estimated. The state equation of the UE bias could therefore preferably be modelled as a random process as:

$$f_{bias,UE}(k+1)=f_{bias,UE}(k)+w_{bias,UE}(k), \tag{10}$$

where $w_{bias,UE}(k)$ is a small process disturbance, modelling the slow change of the UE frequency offset. Then, given any of the state vectors defined for the drone movement, and denoting these state vectors with x it follows that the augmented state vector can be written as $$x_{augmented} = \begin{pmatrix} x \\ f_{bias,UE} \end{pmatrix}. \tag{11}$$

A corresponding augmentation is needed for the systems noise vector and the systems noise covariance matrix. The augmentation parallels the above procedure and is not repeated here.

Denoting the Doppler frequency measured in site s and related quantities with a subscript s as above, leads to $$f_{d,s} = \frac{v_s}{c} f_c + f_{bias,UE}, \tag{12}$$

where $v_s$ denotes the speed with which the distance between node s and the UE (rogue drone) increases. Note that the UE bias Doppler is the same for all sites.

In other words, in one embodiment, the determining of an estimated motion comprises estimation of a kinematic state of the UE. The UE frequency offset compensation is then performed by state vector augmentation. Preferably, the state vector augmentation comprises modelling of a UE frequency bias as a random process.

After augmentation, the IMM filtering proceeds as described above, using the augmented state vectors and corresponding matrices.

The Doppler shift measurements give information of the range rate between the UE and different base stations. Range rate processing, in the case of augmentation as described above, exploits that information for enhancing UE state estimation, e.g. for a rouge drone. To do so, it is necessary to relate the measured Doppler frequency, to the estimated states in a measurement equation, where the Doppler bias state is denoted $x_{bias,UE}$.

Now some vector computations lead to:

$$v_s = \frac{(\dot{r} - r_s)}{\|\dot{r} - r_s\|} \cdot r = \frac{(\hat{x}_1 - x_{s,1})\hat{x}_4 + (\hat{x}_2 - x_{s,2})\hat{x}_5 + (\hat{x}_3 - x_{s,3})\hat{x}_6}{\sqrt{(\hat{x}_1 - x_{s,1})^2 + (\hat{x}_2 - x_{s,2}) + (\hat{x}_3 - x_{s,3})}}. \tag{13}$$

The disclosed combined measurement equation for one Doppler shift measurement thus becomes:

$$f_{D,s} = h(\hat{x}) = \frac{f_c}{c} \frac{((\hat{x}_1 - x_{s,1})\hat{x}_4 + (\hat{x}_2 - x_{s,2})\hat{x}_5 + (\hat{x}_3 - x_{s,3})\hat{x}_6)}{\sqrt{(\hat{x}_1 - x_{s,1})^2 + (\hat{x}_2 - x_{s,2})^2 + (\hat{x}_3 - x_{s,3})^2}} + x_{bias,UE} \tag{14}$$

Several measurement equations are then straightforward to combine, by adding rows to the measurement matrix $h(\hat{x})$ of the EKF. It remains to compute the derivative of the measurement matrix. Examplifying this computation for site s results in:

$$\frac{\partial h(\hat{x})}{\partial \hat{x}} = \begin{pmatrix} \frac{\partial h}{\partial \hat{x}_1} & \frac{\partial h}{\partial \hat{x}_2} & \frac{\partial h}{\partial \hat{x}_3} & \frac{\partial h}{\partial \hat{x}_4} & \frac{\partial h}{\partial \hat{x}_5} & \frac{\partial h}{\partial \hat{x}_6} & 0 & 0 & 0 & 1 \end{pmatrix}, \text{where} \tag{15}$$

$$\frac{\partial h}{\partial \hat{x}_1} = \frac{f_c}{c} \frac{\hat{x}_4}{\sqrt{(\hat{x}_1 - x_{s,1})^2 + (\hat{x}_2 - x_{s,2})^2 + (\hat{x}_3 - x_{s,3})^2}} - \tag{16}$$

$$\frac{f_c}{c} \frac{((\hat{x}_1 - x_{s,1})\hat{x}_4 + (\hat{x}_2 - x_{s,2})\hat{x}_5 + (\hat{x}_3 - x_{s,3})\hat{x}_6)}{((\hat{x}_1 - x_{s,1})^2 + (\hat{x}_2 - x_{s,2})^2 + (\hat{x}_3 - x_{s,3})^2)^{\frac{3}{2}}},$$

$$\frac{\partial h}{\partial \hat{x}_2} = \frac{f_c}{c} \frac{\hat{x}_5}{\sqrt{(\hat{x}_1 - x_{s,1})^2 + (\hat{x}_2 - x_{s,2})^2 + (\hat{x}_3 - x_{s,3})^2}} - \tag{17}$$

$$\frac{f_c}{c} \frac{((\hat{x}_1 - x_{s,1})\hat{x}_4 + (\hat{x}_2 - x_{s,2})\hat{x}_5 + (\hat{x}_3 - x_{s,3})\hat{x}_6)}{((\hat{x}_1 - x_{s,1})^2 + (\hat{x}_2 - x_{s,2})^2 + (\hat{x}_3 - x_{s,3})^2)^{\frac{3}{2}}},$$

$$\frac{\partial h}{\partial \hat{x}_3} = \frac{f_c}{c} \frac{\hat{x}_6}{\sqrt{(\hat{x}_1 - x_{s,1})^2 + (\hat{x}_2 - x_{s,2})^2 + (\hat{x}_3 - x_{s,3})^2}} - \tag{18}$$

$$\frac{f_c}{c} \frac{((\hat{x}_1 - x_{s,1})\hat{x}_4 + (\hat{x}_2 - x_{s,2})\hat{x}_5 + (\hat{x}_3 - x_{s,3})\hat{x}_6)}{((\hat{x}_1 - x_{s,1})^2 + (\hat{x}_2 - x_{s,2})^2 + (\hat{x}_3 - x_{s,3})^2)^{\frac{3}{2}}},$$

$$\frac{\partial h}{\partial \hat{x}_4} = \frac{f_c}{c} \frac{(\hat{x}_1 - x_{s,1})}{\sqrt{(\hat{x}_1 - x_{s,1})^2 + (\hat{x}_2 - x_{s,2})^2 + (\hat{x}_3 - x_{s,3})^2}}, \tag{19}$$

$$\frac{\partial h}{\partial \hat{x}_5} = \frac{f_c}{c} \frac{(\hat{x}_2 - x_{s,2})}{\sqrt{(\hat{x}_1 - x_{s,1})^2 + (\hat{x}_2 - x_{s,2})^2 + (\hat{x}_3 - x_{s,3})^2}}, \tag{20}$$

-continued $$\frac{\partial h}{\partial \hat{x}_6} = \frac{f_c}{c} \frac{(\hat{x}_3 - x_{s,3})}{\sqrt{(\hat{x}_1 - x_{s,1})^2 + (\hat{x}_2 - x_{s,2})^2 + (\hat{x}_3 - x_{s,3})^2}}. \quad (21)$$

In this example it is thus assumed that the measurement is done with respect to one site, at the time of update. In an application, multiple measurements would appear as new rows. Note also that the Jacobian as given is given for the constant acceleration model, as an example. Obvious modifications appear for the constant velocity model.

Another alternative is UE frequency offset compensation by difference formation. Here, differences are formed between the measurements of all sites. Assuming that Doppler is measured in n sites, results in the following differences between measurements:

$$\Delta f_{d,1,s} = f_{d,1} - f_{d,s} = \frac{f_c}{c}(v_1 - v_s), \, s = 2, \dots, n. \quad (22)$$

The UE Doppler bias is hence eliminated and processing can proceed without it. The price paid appears in that the state dependent depart velocity changes need to be treated in the measurement equations of the EKFs. There are of course many other ways to form differences than with respect to site 1 and the present description shall not be interpreted to be restrictive in this sense.

In other words, in one embodiment, the determining of an estimated motion comprises estimation of a kinematic state of the UE. The UE frequency offset compensation is performed by difference formation. Preferably, the difference formation comprises formation of differences between the first Doppler shift measurement and respective second Doppler shift measurements.

Proceeding with the difference case for range rate processing, it is necessary to relate the measured Doppler frequency differences, to the estimated states in a measurement equation.

Now some vector computations for arbitrary site s leads to:

$$v_s = \frac{(\hat{r} - r_s)}{\|\hat{r} - r_s\|} \cdot \dot{\hat{r}} = \frac{(\hat{x}_1 - x_{s,1})\hat{x}_4 + (\hat{x}_2 - x_{s,2})\hat{x}_5 + (\hat{x}_3 - x_{s,3})\hat{x}_6}{\sqrt{(\hat{x}_1 - x_{s,1})^2 + (\hat{x}_2 - x_{s,2}) + (\hat{x}_3 - x_{s,3})}}. \quad (23)$$

The disclosed combined measurement equation for one Doppler difference measurement between site 1 and site s thus becomes:

$$\Delta f_{d,1,s} = h(\hat{x}) = \frac{f_c}{c} \frac{((\hat{x}_1 - x_{1,1})\hat{x}_4 + (\hat{x}_2 - x_{1,2})\hat{x}_5 + (\hat{x}_3 - x_{1,3})\hat{x}_6)}{\sqrt{(\hat{x}_1 - x_{1,1})^2 + (\hat{x}_2 - x_{1,2}) + (\hat{x}_3 - x_{1,3})}} -$$
$$\frac{f_c}{c} \frac{((\hat{x}_1 - x_{s,1})\hat{x}_4 + (\hat{x}_2 - x_{s,2})\hat{x}_5 + (\hat{x}_3 - x_{s,3})\hat{x}_6)}{\sqrt{(\hat{x}_1 - x_{s,1})^2 + (\hat{x}_2 - x_{s,2})^2 + (\hat{x}_3 - x_{s,3})^2}} \quad (24)$$

Several measurement equations are then straightforward to combine, by adding rows to the measurement matrix h(x̂) of the Extended Kalman Filter (EKF). It remains to compute the derivative of the measurement matrix. Exemplifying this computation for site s results in:

$$\frac{\partial h(\hat{x})}{\partial \hat{x}} = \left(\frac{\partial h}{\partial \hat{x}_1} \quad \frac{\partial h}{\partial \hat{x}_2} \quad \frac{\partial h}{\partial \hat{x}_3} \quad \frac{\partial h}{\partial \hat{x}_4} \quad \frac{\partial h}{\partial \hat{x}_5} \quad \frac{\partial h}{\partial \hat{x}_6} \quad 0 \quad 0 \quad 0\right) \text{ where} \quad (25)$$

-continued $$\frac{\partial h}{\partial \hat{x}_1} = \frac{f_c}{c} \frac{\hat{x}_4}{\sqrt{(\hat{x}_1 - x_{1,1})^2 + (\hat{x}_2 - x_{1,2})^2 + (\hat{x}_3 - x_{1,3})^2}} - \quad (26)$$
$$\frac{f_c}{c} \frac{\hat{x}_4}{\sqrt{(\hat{x}_1 - x_{s,1})^2 + (\hat{x}_2 - x_{s,2})^2 + (\hat{x}_3 - x_{s,3})^2}} -$$
$$\frac{f_c}{c} \frac{(\hat{x}_1 - x_{1,1})((\hat{x}_1 - x_{1,1})\hat{x}_4 + (\hat{x}_2 - x_{1,2})\hat{x}_5 + (\hat{x}_3 - x_{1,3})\hat{x}_6)}{\left((\hat{x}_1 - x_{1,1})^2 + (\hat{x}_2 - x_{1,2})^2 + (\hat{x}_3 - x_{1,3})^2\right)^{\frac{3}{2}}} +$$
$$\frac{f_c}{c} \frac{(\hat{x}_1 - x_{s,1})((\hat{x}_1 - x_{s,1})\hat{x}_4 + (\hat{x}_2 - x_{s,2})\hat{x}_5 + (\hat{x}_3 - x_{s,3})\hat{x}_6)}{\left((\hat{x}_1 - x_{s,1})^2 + (\hat{x}_2 - x_{s,2})^2 + (\hat{x}_3 - x_{s,3})^2\right)^{\frac{3}{2}}}$$

$$\frac{\partial h}{\partial \hat{x}_2} = \frac{f_c}{c} \frac{\hat{x}_5}{\sqrt{(\hat{x}_1 - x_{1,1})^2 + (\hat{x}_2 - x_{1,2})^2 + (\hat{x}_3 - x_{1,3})^2}} - \quad (27)$$
$$\frac{f_c}{c} \frac{\hat{x}_5}{\sqrt{(\hat{x}_1 - x_{s,1})^2 + (\hat{x}_2 - x_{s,2})^2 + (\hat{x}_3 - x_{s,3})^2}} -$$
$$\frac{f_c}{c} \frac{(\hat{x}_2 - x_{1,2})((\hat{x}_1 - x_{s,1})\hat{x}_4 + (\hat{x}_2 - x_{s,2})\hat{x}_5 + (\hat{x}_3 - x_{s,3})\hat{x}_6)}{\left((\hat{x}_1 - x_{1,1})^2 + (\hat{x}_2 - x_{1,2})^2 + (\hat{x}_3 - x_{1,3})^2\right)^{\frac{3}{2}}} +$$
$$\frac{f_c}{c} \frac{(\hat{x}_2 - x_{s,2})((\hat{x}_1 - x_{s,1})\hat{x}_4 + (\hat{x}_2 - x_{s,2})\hat{x}_5 + (\hat{x}_3 - x_{s,3})\hat{x}_6)}{\left((\hat{x}_1 - x_{s,1})^2 + (\hat{x}_2 - x_{s,2})^2 + (\hat{x}_3 - x_{s,3})^2\right)^{\frac{3}{2}}},$$

$$\frac{\partial h}{\partial \hat{x}_3} = \frac{f_c}{c} \frac{\hat{x}_6}{\sqrt{(\hat{x}_1 - x_{1,1})^2 + (\hat{x}_2 - x_{1,2})^2 + (\hat{x}_3 - x_{1,3})^2}} - \quad (28)$$
$$\frac{f_c}{c} \frac{\hat{x}_6}{\sqrt{(\hat{x}_1 - x_{s,1})^2 + (\hat{x}_2 - x_{s,2})^2 + (\hat{x}_3 - x_{s,3})^2}} -$$
$$\frac{f_c}{c} \frac{(\hat{x}_3 - x_{1,3})((\hat{x}_1 - x_{1,1})\hat{x}_4 + (\hat{x}_2 - x_{1,2})\hat{x}_5 + (\hat{x}_3 - x_{1,3})\hat{x}_6)}{\left((\hat{x}_1 - x_{1,1})^2 + (\hat{x}_2 - x_{1,2})^2 + (\hat{x}_3 - x_{1,3})^2\right)^{\frac{3}{2}}} +$$
$$\frac{f_c}{c} \frac{(\hat{x}_3 - x_{s,3})((\hat{x}_1 - x_{s,1})\hat{x}_4 + (\hat{x}_2 - x_{s,2})\hat{x}_5 + (\hat{x}_3 - x_{s,3})\hat{x}_6)}{\left((\hat{x}_1 - x_{s,1})^2 + (\hat{x}_2 - x_{s,2})^2 + (\hat{x}_3 - x_{s,3})^2\right)^{\frac{3}{2}}},$$

$$\frac{\partial h}{\partial \hat{x}_4} = \frac{f_c}{c} \frac{(\hat{x}_1 - x_{1,1})}{\sqrt{(\hat{x}_1 - x_{1,1})^2 + (\hat{x}_2 - x_{1,2})^2 + (\hat{x}_3 - x_{1,3})^2}} - \quad (29)$$
$$\frac{f_c}{c} \frac{(\hat{x}_1 - x_{s,1})}{\sqrt{(\hat{x}_1 - x_{s,1})^2 + (\hat{x}_2 - x_{s,2})^2 + (\hat{x}_3 - x_{s,3})^2}},$$

$$\frac{\partial h}{\partial \hat{x}_5} = \frac{f_c}{c} \frac{(\hat{x}_2 - x_{1,2})}{\sqrt{(\hat{x}_1 - x_{1,1})^2 + (\hat{x}_2 - x_{1,2})^2 + (\hat{x}_3 - x_{1,3})^2}} - \quad (30)$$
$$\frac{f_c}{c} \frac{(\hat{x}_2 - x_{s,2})}{\sqrt{(\hat{x}_1 - x_{s,1})^2 + (\hat{x}_2 - x_{s,2})^2 + (\hat{x}_3 - x_{s,3})^2}},$$

$$\frac{\partial h}{\partial \hat{x}_6} = \frac{f_c}{c} \frac{(\hat{x}_3 - x_{1,3})}{\sqrt{(\hat{x}_1 - x_{1,1})^2 + (\hat{x}_2 - x_{1,2})^2 + (\hat{x}_3 - x_{1,3})^2}} - \quad (31)$$
$$\frac{f_c}{c} \frac{(\hat{x}_3 - x_{s,3})}{\sqrt{(\hat{x}_1 - x_{s,1})^2 + (\hat{x}_2 - x_{s,2})^2 + (\hat{x}_3 - x_{s,3})^2}}.$$

In this example it is thus assumed that the measurement is done with respect to one site, at the time of update. In an application, multiple measurements would appear as new rows. Note also that the Jacobian as given is given for the constant acceleration model, as an example. Obvious modifications appear for the constant velocity model.

As mentioned above, the new utilization of Doppler shift measurements from a multitude of sites requires some communication of data between the different network nodes.

To describe the new measurement and signaling principle, assume that each node is indexed with i and that each node measures the times $t_{1,i}$. The measurements need to be sent on to the eNB or other network node where the state estimation is performed. The interface between eNBs is denoted X2 and is standardized by Third Generation Partnership Project (3GPP). The X2 interface standardizes a message denoted PRIVATE MESSAGE. This message is essentially a container for any information that needs to be sent over X2, and that is not carried by other messages. The X2 PRIVATE MESSAGE may therefore be selected as one possibility for a message carrying the needed Doppler information.

Another possibility is to provide a standardized dedicated signaling carrying the needed Doppler information.

To enable the Doppler shift frequency based state estimation the following quantities are of great use: the site ID, data representing the actual Doppler shift measurement, the time when the Doppler shift measurement is done (time tag). In addition, the following information may be needed or at least useful, depending on the configuration in the state estimating eNB: The site position, and site Coordinate system details.

The above leads to the following components to be included in a new DOPPLER SHIFT MEASUREMENT MESSAGE disclosed here. This message can e.g. be carried over X2 in an X2 PRIVATE MESSAGE. This message may also be a dedicated signaling.

In other words, in one embodiment, in the serving base station, the data representing the at least one second Doppler shift measurement comprises at least an identity of the site where the second Doppler shift measurement was performed, the second Doppler shift measurement and a time tag for when the second Doppler shift measurement was made.

In particular applications, the data representing the at least one second Doppler shift measurement may further comprise site position information and/or coordinate system details.

Likewise, in one embodiment, in a base station providing Doppler shift measurements, the data representing the at least one second Doppler shift measurement comprises at least an identity of the site where the second Doppler shift measurement was performed, the second Doppler shift measurement and a time tag for when the second Doppler shift measurement was made. In particular applications, the data representing the at least one second Doppler shift measurement further comprises site position information and/or coordinate system details.

An embodiment of a Doppler shift measurement message can thus look like:

DOPPLER SHIFT MEASUREMENT MESSAGE:

Mandatory Information Element: Measuring eNodeB Identity.

Mandatory Information Element: Doppler Shift Measurement

Mandatory Information Element: Time Tag

Optional Information Element: Site Position Component 1

Optional Information Element: Site Position Component 2

Optional Information Element: Site Position Component 3

Optional Information Element: Coordinate System Position Component 1

Optional Information Element: Coordinate System Position Component 2

Optional Information Element: Coordinate System Position Component 3

The Measuring eNB Identity could e.g. be the cell global identity (CGI) or any other uniquely eNB defining identity.

The Doppler Shift Measurement could be encoded e.g. in Hertz [Hz] or radians per second [$s^{-1}$]. Alternatively, it could be encoded in % of the full range. Full range could be calculated from the maximum assumed velocity, the carrier frequency and the speed of light. 2 GHz and a maximum assumed speed of 50 m/s would e.g. result in a maximum doppler frequency of (50/300000000)*2000000000=333 Hz. A typical resolution could be 0.1% of the full range. Note that positive as well as negative Doppler frequencies need to be allowed.

The Time Tag should be expressed in terms of the system time unit of the LTE system. A typical resolution would be 1 ms.

The Site Position Component 1 could be expressed in either a local earth tangential coordinate system, then as the x-coordinate of the antenna position. Alternatively, it could be expressed in a global coordinate system as a latitude. A typical resolution of the encoding would be 1 m, or a corresponding latitude angle in the global coordinate system.

The Site Position Component 2 could be expressed in either a local earth tangential coordinate system, then as the y-coordinate of the antenna position. Alternatively, it could be expressed in a global coordinate system as a longitude. A typical resolution of the encoding would be 1 m, or a corresponding latitude angle in the global coordinate system.

The Site Position Component 3 could be expressed in either a local earth tangential coordinate system, then as the z-coordinate of the antenna position. Alternatively, it could be expressed in a global coordinate system as an altitude of the antenna position. A typical resolution of the encoding would be 1 m, or a corresponding latitude angle in the global coordinate system.

The Coordinate System Position Component 1 would typically be expressed in a global coordinate system as a latitude of the origin of the coordinate system. A typical resolution of the encoding would be a latitude angle resolution corresponding to 1 m.

The Coordinate System Position Component 2 would typically be expressed in a global coordinate system as a longitude of the origin of the coordinate system. A typical resolution of the encoding would be a longitude angle resolution corresponding to 1 m.

The Coordinate System Position Component 3 would typically be expressed in a global coordinate system as an altitude of the origin of the coordinate system. A typical resolution of the encoding would be an altitude resolution corresponding to 1 m.

The Doppler shift measurement is typically set up as a periodic measurement in each contributing eNB. The periodicity could typically be in the range 0.1 s-5 s. At the time of each measurement the measuring eNB would also register the exact time of the measurement and compile a DOPPLER SHIFT MEASUREMENT MESSAGE. In one embodiment, the message is embedded in an X2 PRIVATE MESSAGE and send it over X2 to the receiving eNB. In an alternative embodiment, individual measurements may be setup by repeated orders from the serving eNB or other network node, however that is not preferred since it would be inefficient.

In prior art, there is no Doppler shift measurement and range rate processing principle available, that allows Doppler shift measurements from multiple eNBs/gNBs with respect to a UE, to be aggregated in a single eNB/gNB that performs range rate processing based on the Doppler shift measurements, thereby performing UE kinematic state estimation. Note that range measurement can be performed using a combination of timing advance and pathloss, however the accuracy is insufficient without supporting Doppler shift measurements.

In prior art, there is no bias elimination technique that allows compensation for the unknown UE frequency offset bias. Without such bias the Doppler frequency synchronization applied in the eNBs/gNBs would be neutralized, rendering the supporting Doppler shift measurements less useful for UE kinematic state estimation purposes.

There is no signaling defined in wireless specifications, or proprietary, that allows Doppler shift measurements from multiple eNBs/gNBs with respect to a UE, to be aggregated in a single eNB/gNB.

There is no UE kinematic state estimation technology in prior art that is able to fuse range information from multiple eNB, where the range information comprises at least serving cell round-trip time and neighbor cell path loss measurements, with Doppler shift measurements from multiple eNBs/gNBs, making it difficult if not impossible to perform eNB/gNB based rogue drone tracking in LTE and NR base stations.

The present disclosure addresses the above-mentioned problems by presenting new Uplink Doppler shift measurements and range rate processing methods based on the Doppler shift measurements, where the measurements being obtained in multiple eNBs. Furthermore, in preferred embodiments, new UE Doppler bias elimination methods that remove the effect of the UE frequency offset, are presented. The UE frequency offset would possibly otherwise cause failure or at least degradation of the Doppler processing. Furthermore, new signaling means for distribution of measured/estimated Doppler frequencies measured in multiple eNBs, with respect to a UE, to another eNB is proposed. UE kinematic state estimation is performed in that eNB (or other network node) based on the Doppler shift measurements/estimates.

Note that the techniques disclosed are applicable to LTE and NR, although range-only UE kinematic state estimation may become feasible in NR in case highly accurate time synchronization becomes available. Then the technology would typically be exercised in and on interfaces between gNBs, although the 4th Generation (4G) LTE case was used here to describe the invention.

In particular when applied to kinematic state estimation of drones, an IMM filter with a) a new combination of models, adapted to the hovering capabilities of drones, b) with a new restricted mode transition probability model, reflecting the characteristics of the hovering capability, as well as c) with integrated measurement fusion of range-only measurements with respect to multiple eNBs can be used.

Figure 9:
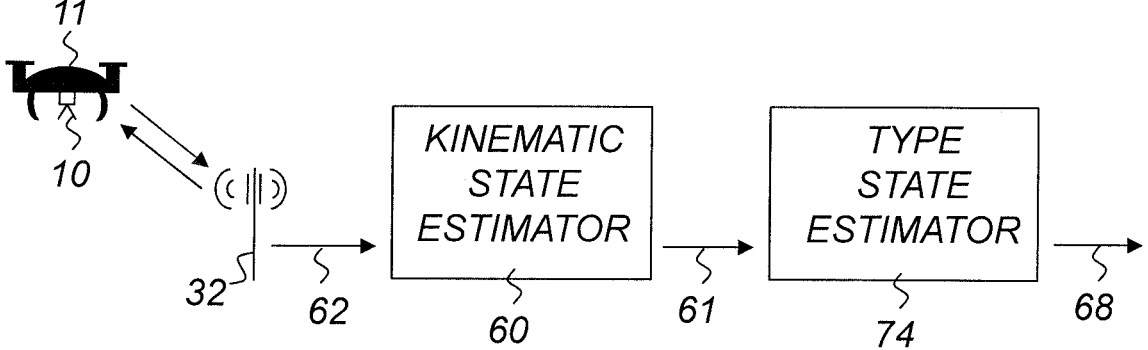
FIG. 9 is a schematic block diagram illustrating the drone state estimation problem.

The drone state estimation problem treated by this is schematically illustrated in FIG. 9. A drone 11, comprising a UE 10 moves e.g. in a restricted area. The drone 11 communicates via base stations, e.g. eNBs/gNBs 32, which provides noisy kinematic measurements 62. These kinematic measurements 62 can e.g. be the range between respective eNB/gNB 32 and the drone, or as described here above, Doppler shift measurements. A UE kinematic state estimator 60 uses these noisy kinematic measurements 62 to provide kinematic state estimations 61. A UE type state estimator 74 can analyze the state estimations 61 and, by using knowledge of the characteristic movements of a drone 11, determine that the UE 10 has to be attached to a drone 11. Different kinds of measures can thus be performed based on drone type information 68.

Some particular measures may be taken to adapt the tracking system to solve the drone problem. A new 3-mode drone movement model can be adopted. This is described more in detail in Appendix G.

Inclusion of ground altitude information is discussed in Appendix H.

As used herein, the non-limiting terms "User Equipment (UE)", "station (STA)" and "wireless communication device" or "wireless device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like. In particular, the term "UE", the term "Station", the term "wireless device" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base stations such as Node Bs (NB), or evolved Node Bs (eNB), New radio Node Bs (gNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like. In the present disclosure, the term "base station" is used as a general term defining a node providing user plane and control plane protocol terminations towards a UE and being connected to a core network. Typical, non-exclusive, examples of Node Bs are a node B as specified for UMTS, "eNodeB" or "Evolved Node B" as specified for LTE, and gNB as specified for NR systems.

In the following, the general non-limiting term "communication unit" includes network nodes and/or associated wireless devices.

As used herein, the term "network device" may refer to any device located in connection with a communication network, including but not limited to devices in access networks, core networks and similar network structures. The term network device may also encompass cloud-based network devices.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided a network node configured to provide motion information of a UE in a wireless communication system. The network node is configured to initiate a first Doppler shift measurement concerning the UE. The network node is further configured to initiate a transfer of requests for second Doppler shift measurement to at least one second network node concerning the UE. The network node is further configured to obtain data representing the first Doppler shift measurement. The network node is configured to obtain data representing the at least one second Doppler shift measurement. The network node is configured to determine an estimated motion, in more than one dimension, of the UE in dependence of at least the obtained data representing the first Doppler shift measurement and the obtained data representing the at least one second Doppler shift measurement.

According to another aspect of the proposed technology there is provided a network node for assisting in providing of motion information of a UE in a wireless communication system. The network node is configured to obtain a request for a Doppler shift measurement concerning the UE. The UE is connected to another network node different from the network node. The network node is further configured to initiate a Doppler shift measurement concerning the UE according to the request. The network node is further configured to obtain a Doppler shift measurement made according to the request. The network node is further configured to initiate a transferring of data representing the obtained Doppler shift measurement to the network node initiating the request.

Figure 10:
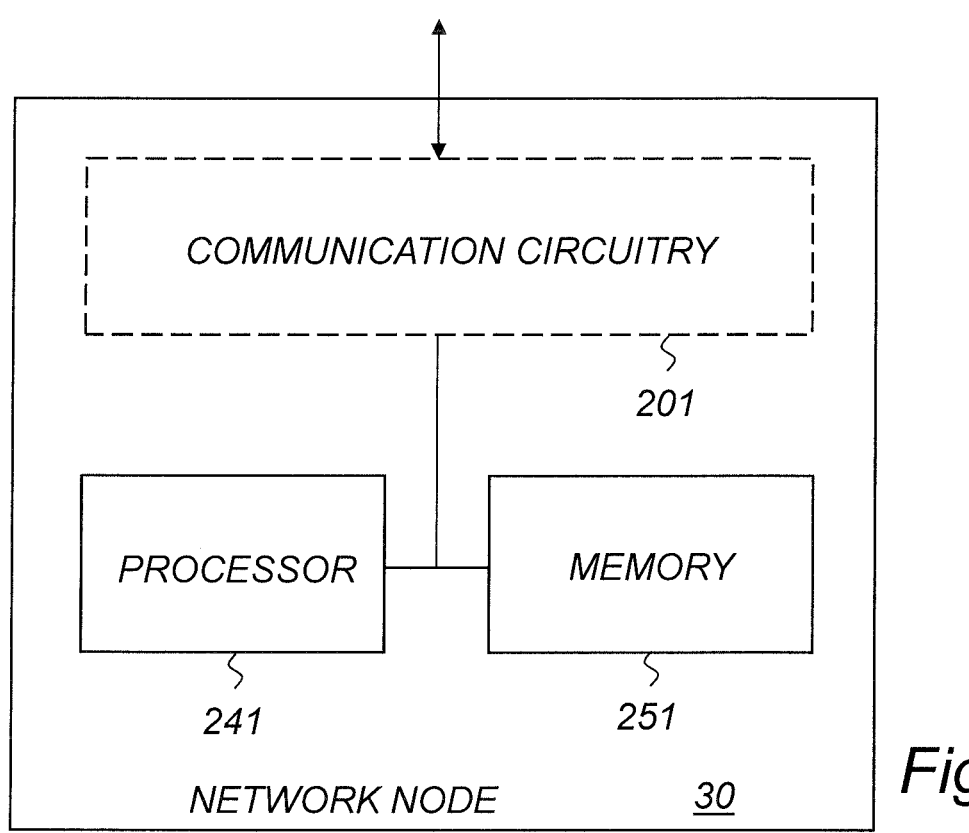
FIG. 10 is a schematic block diagram illustrating an embodiment of a network node.

FIG. 10 is a schematic block diagram illustrating an example of a network node 30, based on a processor-memory implementation according to an embodiment. In this particular example, the network node 30 comprises a processor 241 and a memory 251, the memory 251 comprising instructions executable by the processor 241.

According to the first aspect above, the processor 241 is operative to determine an estimated motion, in more than one dimension, of the UE in dependence of at least the obtained data representing the first Doppler shift measurement and the obtained data representing the at least one second Doppler shift measurement.

According to the second aspect above, the processor 241 is operative to initiate the Doppler shift measurement and to obtain the Doppler shift measurement made according to the request.

Optionally, the network node 30 may also include a communication circuitry 201. The communication circuitry 201 may include functions for wired and/or wireless communication with other devices and/or network nodes in the network. In a particular example, the communication circuitry 201 may be based on radio circuitry for communication with one or more other nodes, including transmitting and/or receiving information. The communication circuit 201 may be interconnected to the processor 241 and/or memory 251. By way of example, the communication circuit 201 may include any of the following: a receiver, a transmitter, a transceiver, input/output (I/O) circuitry, input port (s) and/or output port(s).

According to the first aspect above, the communication circuit 201 is operative to initiate the transfer of requests for second Doppler shift measurement to at least one second network node concerning the UE, and to obtain data representing the at least one second Doppler shift measurement.

According to the second aspect above, the communication circuit 201 is operative to obtain the request for the Doppler shift measurement and to initiate the transferring of data representing the obtained Doppler shift measurement.

According to the first aspect above, in one embodiment, the network node is configured to comprise an estimation of a kinematic state of the UE in the determining of an estimated motion.

In one embodiment, the network node is further configured to initiate an increased number of scheduled resource blocks for uplink signaling from the UE. The requests thereby comprise a request to measure over the increased number of resource blocks for uplink signaling from the UE. Preferably, the scheduled resource blocks for uplink signaling from the UE are resource blocks for PUSCH.

In one embodiment, the network node is further configured to initiate scheduling of resource blocks for uplink signaling from the UE in several subframes. The requests thereby comprise a request to measure over the resource blocks for uplink signaling from the UE in the several subframes and to average the measurements.

In one embodiment, the network node is further configured to obtain a signal-to-noise ratio for uplink signaling from the UE as measured by the at least one second network node. The initiating of an increased number of scheduled resource blocks for uplink signaling from the UE or the initiating of scheduling of resource blocks for uplink signaling from the UE in several subframes is thereby performed in dependence of the signal-to-noise ratio.

In one embodiment, the network node is configured to comprise a UE frequency offset compensation in the determining of an estimated motion of the UE.

In a further embodiment, the network node is configured to comprise an estimation of a kinematic state of the UE in the determining of an estimated motion. The UE frequency offset compensation is performed by state vector augmentation. Preferably, the state vector augmentation comprises modelling of a UE frequency bias as a random process.

In another further embodiment, the network node is configured to comprise an estimation of a kinematic state of the UE in the determining of an estimated motion. The UE frequency offset compensation is performed by difference formation. Preferably, the difference formation comprises formation of differences between the first Doppler shift measurement and respective second Doppler shift measurements.

In one embodiment, the data representing the at least one second Doppler shift measurement comprises at least an identity of the site where the second Doppler shift measurement was performed, the second Doppler shift measurement and a time tag for when the second Doppler shift measurement was made.

In a further embodiment, the data representing the at least one second Doppler shift measurement further comprises site position information and/or coordinate system details.

According to the second aspect above, in one embodiment, the request comprises a request to measure over an increased number of resource blocks for uplink signaling from the UE. The network node is configured to initiate a Doppler shift measurement over the increased number of scheduled resource blocks for uplink signaling from the UE. Preferably, the scheduled resource blocks for uplink signaling from the UE are resource blocks for PUSCH.

In one embodiment, the request comprises a request to measure over resource blocks for uplink signaling from the UE in several subframes and to average the measurements. The network node is configured to initiate a Doppler shift measurement over the resource blocks for uplink signaling from the UE in several subframes. The network node is further configured to average obtained Doppler shift measurements made over the resource blocks for uplink signaling from the UE in several subframes.

In one embodiment, the data representing the at least one second Doppler shift measurement comprises at least an identity of the site where the second Doppler shift measurement was performed, the second Doppler shift measurement and a time tag for when the second Doppler shift measurement was made.

In a further embodiment, the data representing the at least one second Doppler shift measurement further comprises site position information and/or coordinate system details.

Figure 11:
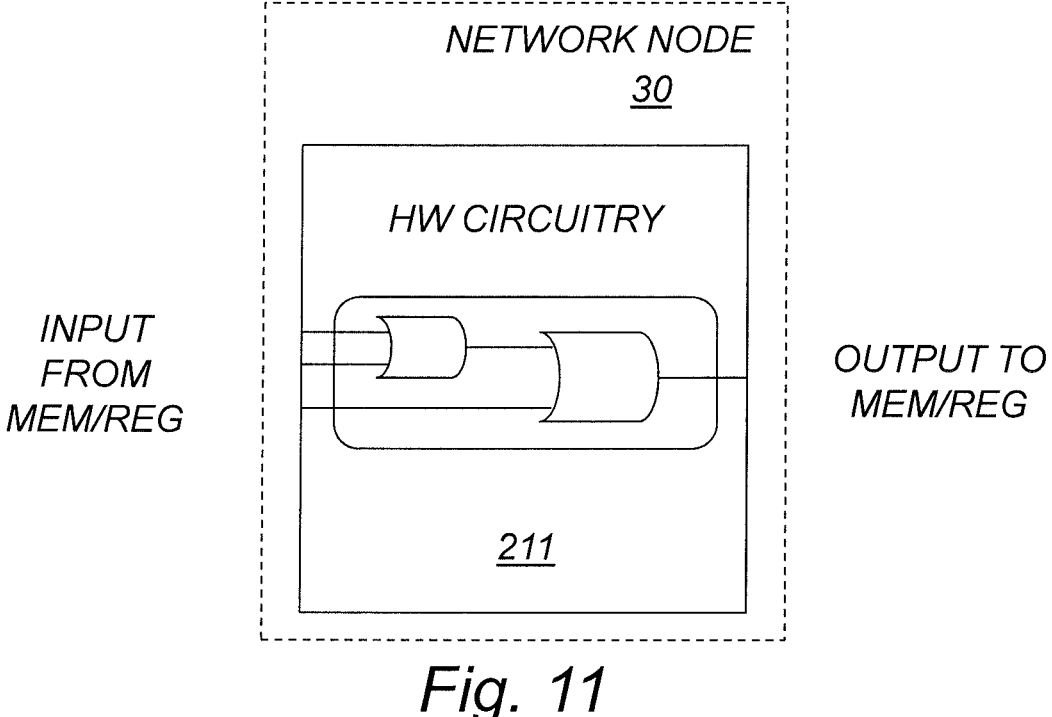
FIG. 11 is a schematic block diagram illustrating an embodiment of a network node based on a hardware circuitry implementation.

FIG. 11 is a schematic block diagram illustrating another example of a network node 30, based on a hardware circuitry implementation according to an embodiment. Particular examples of suitable hardware (HW) circuitry 211 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figures 12, 14:
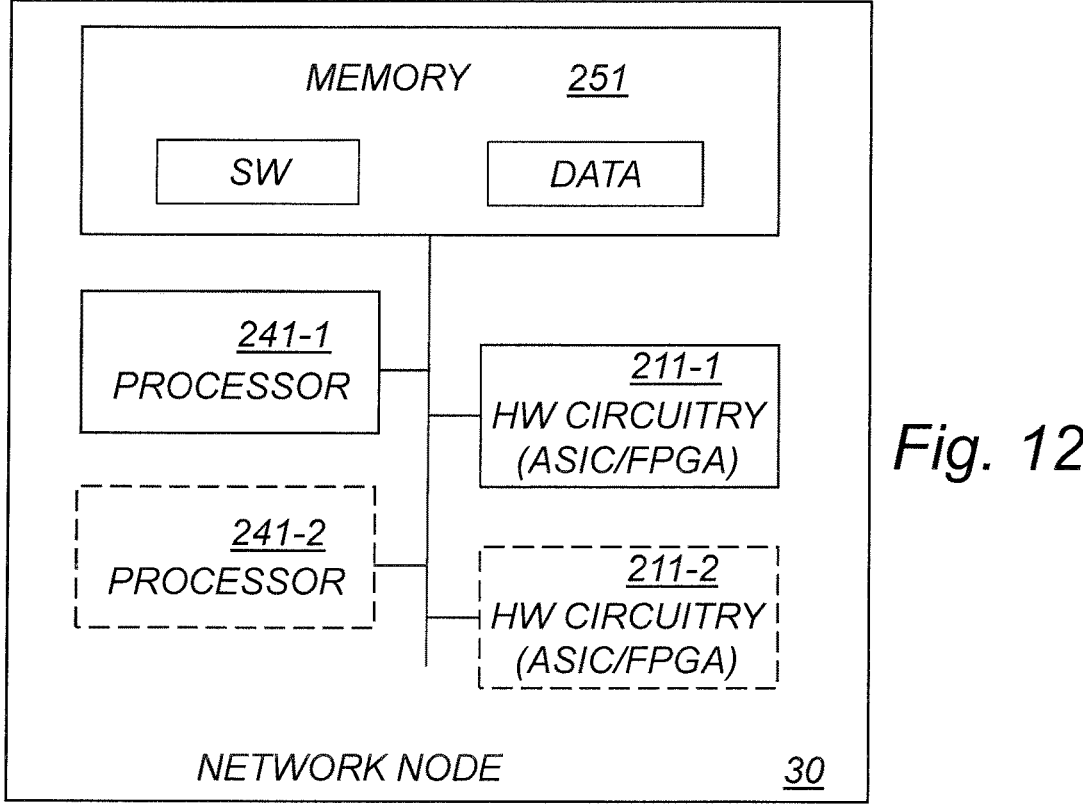
FIG. 12 is a schematic block diagram illustrating another embodiment of a network node based on combination of both processor and hardware circuitry.
FIG. 14 is a schematic block diagram illustrating an embodiment of a network device.

FIG. 12 is a schematic block diagram illustrating yet another example of a network node 30, based on combination of both processor(s) 241-1, 241-2 and hardware circuitry 211-1, 211-2 in connection with suitable memory unit(s) 251. The network node 30 comprises one or more processors 241-1, 241-2, memory 251 including storage for software and data, and one or more units of hardware circuitry 211-1, 211-2 such as ASICs and/or FPGAs. The overall functionality is thus partitioned between programmed software (SW) for execution on one or more processors 241-1, 241-2, and one or more pre-configured or possibly reconfigurable hardware circuits 211-1, 211-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 13:
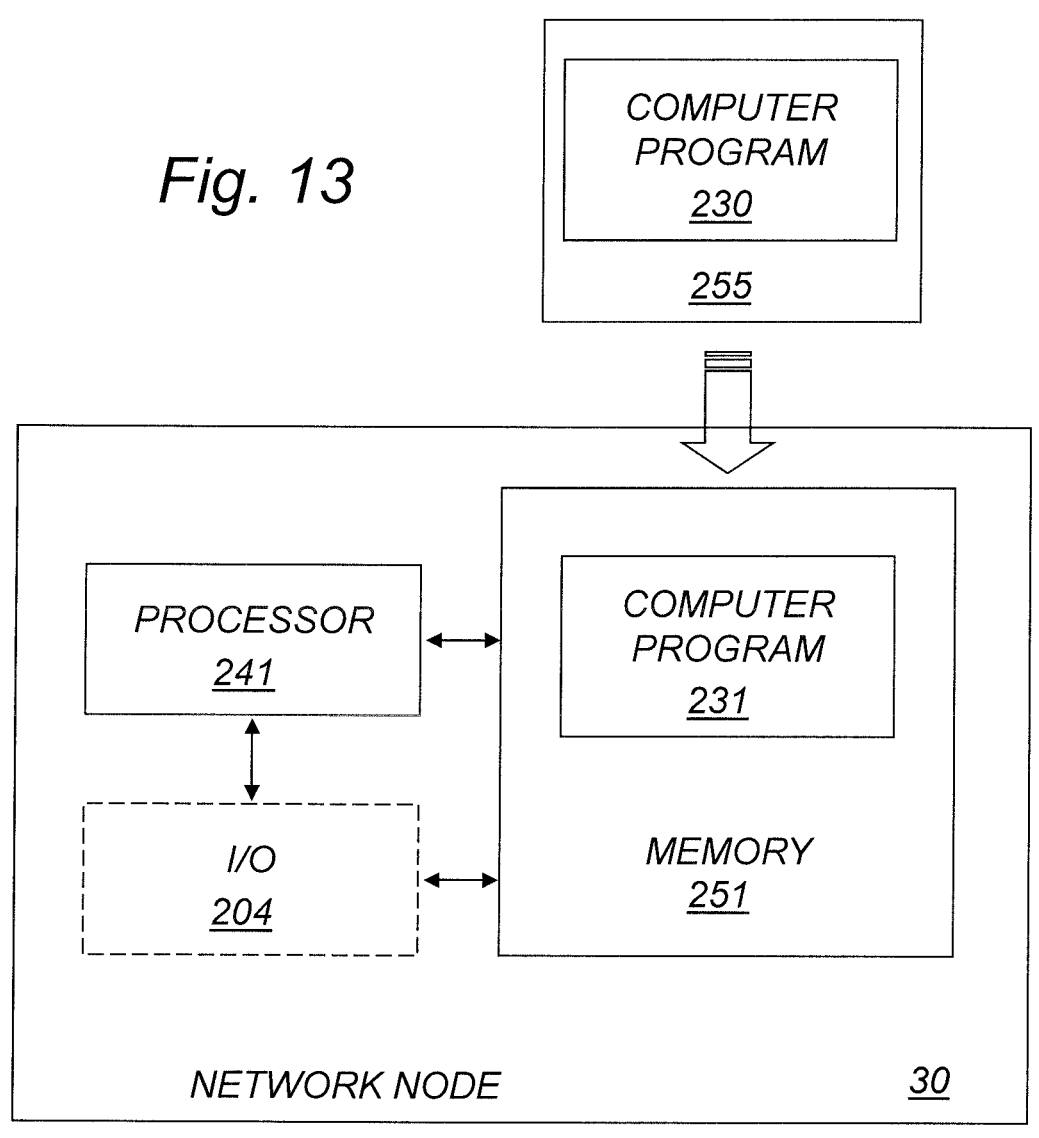
FIG. 13 is a schematic diagram illustrating an embodiment of a computer-implementation of a network node.

FIG. 13 is a schematic diagram illustrating an embodiment of a computer-implementation of a network node 30. In this particular embodiment, at least some of the steps, functions, procedures, modules and/or blocks described herein are implemented in a computer program 231, which is loaded into the memory 251 for execution by processing circuitry including one or more processors 241. The processor(s) 241 and memory 251 are interconnected to each other to enable normal software execution. An optional input/output device 204 may also be interconnected to the processor(s) 241 and/or the memory 251 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 241 is thus configured to perform, when executing the computer program 231, well-defined processing tasks such as those described herein. The terms "processing circuitry" and "processor" will in the present disclosure be used as synonymous expressions.

The processing circuitry does not have to be dedicated to only execute the above-described steps, functions, procedure and/or blocks, but may also execute other tasks.

In a particular embodiment, the computer program 231 comprises instructions, which when executed by at least one processor 241, cause the processor(s) 241 to initiate a first Doppler shift measurement concerning the UE, to initiate a transfer of requests for second Doppler shift measurement to at least one second network node concerning the UE, to obtain data representing the first Doppler shift measurement, to obtain data representing the at least one second Doppler shift measurement, and to determine an estimated motion, in more than one dimension, of the UE in dependence of at least the obtained data representing the first Doppler shift measurement and the obtained data representing the at least one second Doppler shift measurement.

In another particular embodiment, the computer program 231 comprises instructions, which when executed by at least one processor 241, cause the processor(s) 241 to obtain a request for a Doppler shift measurement concerning the UE, where the UE is connected to a network node different from the network node, to initiate a Doppler shift measurement concerning the UE according to the request, to obtain a Doppler shift measurement made according to the request; and to initiate a transferring of data representing the obtained Doppler shift measurement to the network node initiating the request.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 230; 231 may be realized as a computer program product, which is normally carried or stored on a computer-readable medium 255; 251, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

FIG. 14 is a schematic block diagram illustrating an example of a network device (ND) 40 comprising a network node 30 according to any of the embodiments.

According to an aspect, there is provided a network device 40 comprising a network node 30 as described herein.

The network device may be any suitable network device in the wireless communication system, or a network device in connection with the wireless communication system. By way of example, the network device may be a suitable network node such a base station or an access point. However, the network device may alternatively be a cloud-implemented network device.

According to another aspect, there is provided a communication unit 10 in a wireless communication system, wherein the communication unit 10 comprises a network node 30 as described herein. The communication unit may be any suitable communication unit in the wireless communication system. By way of example, the communication unit may be a wireless communication device such as a UE, STA or similar end-user device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

FIG. 15 is a schematic diagram illustrating an example of a network node 30 for providing motion information of a UE in a wireless communication system. The network node 30 comprises a Doppler shift module 310 for initiating a first Doppler shift measurement concerning the UE and for obtaining data representing the first Doppler shift measurement. The network node 30 further comprises a transmitter/receiver 320, for initiating a transfer of requests for second Doppler shift measurement to at least one second network node concerning the UE and for obtaining data representing the at least one second Doppler shift measurement. The network node 30 further comprises a motion determining module 330, for determining an estimated motion, in more than one dimension, of the UE in dependence of at least the obtained data representing the first Doppler shift measurement and the obtained data representing the at least one second Doppler shift measurement.

FIG. 16 is a schematic diagram illustrating an example of a network node 30 for assisting in providing of motion information of a UE in a wireless communication system. The network node 30 comprises a transmitter/receiver 320, for obtaining a request for a Doppler shift measurement concerning the UE, where the UE is connected to another network node. The network node 30 comprises a Doppler shift measurement module 310, for initiating a Doppler shift measurement concerning the UE according to the request and for obtaining a Doppler shift measurement made according to the request. The transmitter/receiver 320 is further configured for initiating a transferring of data representing the obtained Doppler shift measurement to the network node initiating the request.

It is easily understood that the embodiments of FIGS. 15 and 16 easily are combined into one single node, capable of both procedures.

Alternatively, it is possible to realize the module(s) in FIGS. 15 and 16 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

Figures 17, 18:
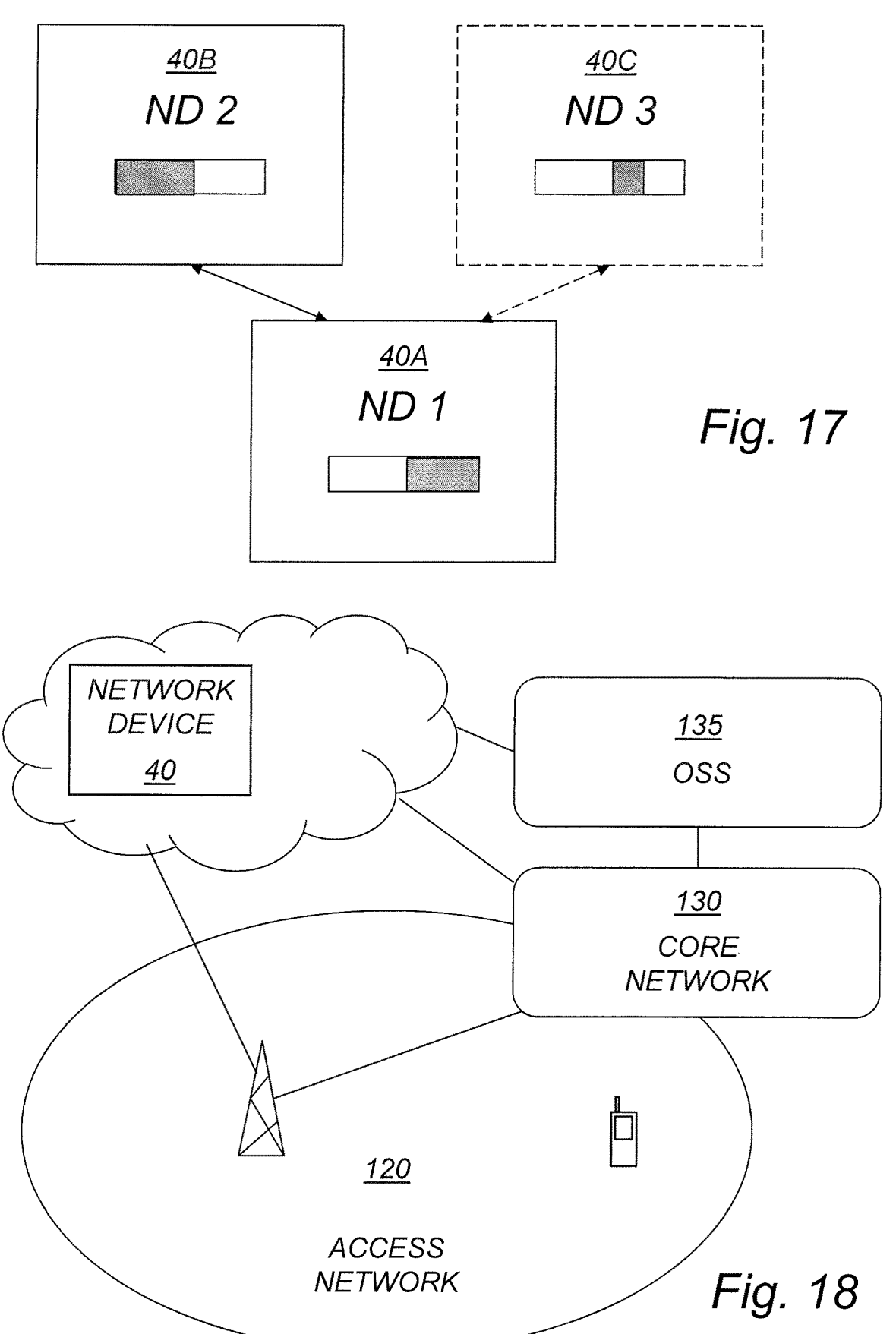
FIG. 17 is a schematic diagram illustrating a general example of functionality distribution or partition.
FIG. 18 is a schematic diagram illustrating an example of a wireless communication system in cooperation with one or more cloud-based network devices.

FIG. 17 is a schematic diagram illustrating an example of how functionality can be distributed or partitioned between different Network Devices (ND) in a general case. In this example, there are at least two individual, but interconnected network devices, ND 1 and ND 2, with reference numerals 40A and 40B, respectively, which may have different functionalities, or parts of the same functionality, partitioned between the network devices 40A and 40B. There may be additional network devices, such as ND 3, with reference numeral 40C, being part of such a distributed implementation. The network devices 40A-C may be part of the same wireless communication system, or one or more of the network devices may be so-called cloud-based network devices located outside of the wireless communication system.

FIG. 18 is a schematic diagram illustrating an example of a wireless communication system, including an access network 120 and/or a core network 130 and/or an Operations and Support System (OSS), 135 in cooperation with one or more cloud-based network devices 40. Functionality relevant for the access network 120 and/or the core network 130 and/or the OSS system 135 may be at least partially implemented for execution in a cloud-based network device 40, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use Common Off-The-Shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a Wireless Network Interface Controller (WNIC) or through plugging in a cable to a physical port connected to a Network Interface Controller (NIC). During operation, the software may be executed by the hardware to instantiate a set of one or more software instance(s). Each of the software instance(s), and that part of the hardware that executes that software instance, may form a separate virtual network element.

By way of another example, a general-purpose network device may for example include hardware comprising a set of one or more processor(s), often COTS processors, and network interface controller(s) (NICs), as well as non-transitory machine-readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV). Thus, NFV may be used to consolidate many network equipment types onto industry standard high volume server hardware, physical switches, and physical storage, which could be located in data centers, NDs, and Customer Premise Equipment (CPE).

However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a ND. In certain embodiments of such a hybrid network device, a platform Virtual Machine (VM), such as a VM that implements functionality of a special-purpose network device, could provide for para-virtualization to the hardware present in the hybrid network device.

Figure 19:
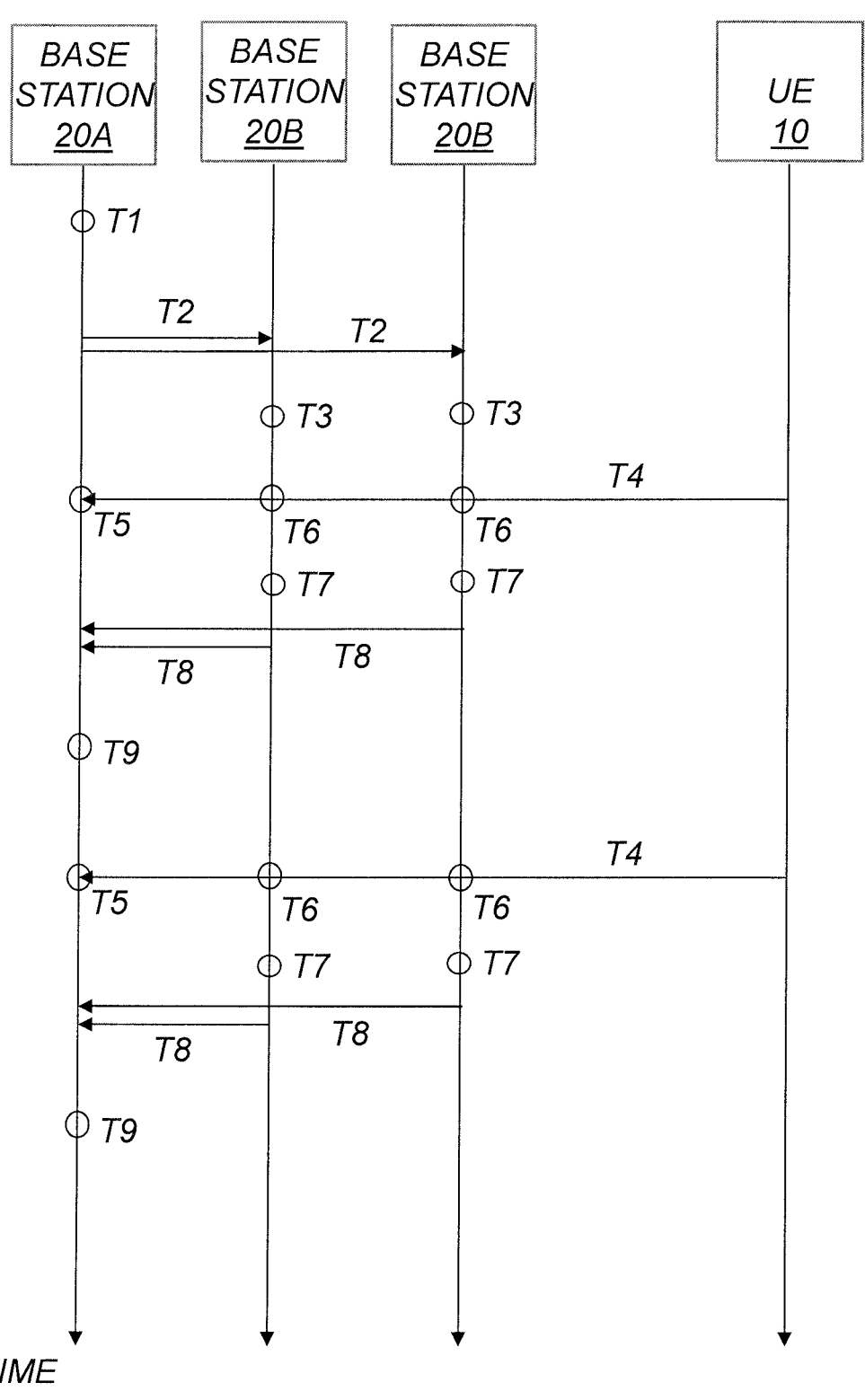
FIG. 19 is a schematic illustration of an example of signaling between network nodes participating in the provision of motion information of a UE.

FIG. 19 illustrates the interaction between the different nodes for providing motion information of a UE 10. The UE 10 is connected to a first base station 20A. A measurement, relative the first base station 20A, of a Doppler shift is initiated T1. Requests T2 for Doppler shifts measurements concerning the UE 10 are sent to second base stations 20B. The second base stations 20B initiates T3 Doppler measurements. The UE 10 has some uplink signaling scheduled, e.g. on the PUSCH. This signaling is intended to reach the first base station 20A, but can also be detected by the second base stations 20B. The first base station 20A utilizes the uplink signal T4 to measure T5 the Doppler shift. Also the second base stations 20B utilizes the signal T4 to accomplish their measurements T6 of the Doppler shift. The second base stations 20B evaluate T7 the Doppler measurements and prepare a report T8 of the measurements and optionally associated information to the first base station 20A. The first base station 20A uses its own measured Doppler shift and the measured Doppler shifts obtained from the second base stations 20B to estimate T9 the kinematic state of the UE.

It can be noted that there is no dedicated signaling between the UE 10 and the second base stations 20B. Instead, the second base stations 20B just listen to the uplink signals between the UE 10 and the first base station 20A for Doppler shift determinations.

Typically, the measurement requests are requests of repeated measurements, and any future uplink signals from the UE can therefore give rise to new Doppler shift measurements, as indicated in the bottom of the Figure.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

APPENDIX A

One example block-diagram of a so-called multi-sensor state estimation system is depicted in FIG. 1.

The operation of this particular system can be briefly explained as follows. Measurements consisting of strobes and plots are first collected from the sensors attached to the moving object estimation system. Strobes are angle-only measurements and plots are Cartesian position measurements. The plots and strobes are sent to an input processing unit for association with existing three-dimensional state estimates. Association is the process of determining which measurements that belong to each state estimate.

The association is performed in the measurement space of each sensor, i.e. the state estimates, which typically reside in an earth tangential Cartesian coordinate system, are transformed to the measurement space of each sensor. Associated data then update state estimates in a state estimation kernel, typically with Kalman filtering techniques, as discussed further below, again in the measurement space of each sensor. Plots and strobes that are not associated may originate from new objects and they are sent to the plot handler or the strobe handler for initiation of new state estimates. Crosses are pairs of strobes tentatively associated with new objects. Plots and strobes that are associated to high quality estimates are also used for computation of sensor bias parameters in the sensor registration block.

If such a state estimation technique is implemented in a wireless communication system, the input measurements may be of a range-only character. In other words, the distance to the object of the state estimation from a sensor is measured, but the direction is basically unknown.

Furthermore, some simplifications may be implemented. In a wireless communication system, each UE has a unique ID when attached to the cellular system. This means that the above described association process is not needed. Moreover, the advanced state initiation is not generally needed in the wireless communication system, but the known techniques may be combined with the technology presented here for further enhancement. Finally, the sensor registration described above is typically not needed in the present implementation. However, the known techniques may be combined with the current ideas for further enhancement.

APPENDIX B

There are many known methods for estimation when multiple dynamic modes describe the behavior of an object, whose state is estimated.

A first and most general way of performing such estimation would be to depend on the joint probability distribution of the objects state. The propagation of this state forward in time is known in prior art to be governed by the so-called Fokker-Planck partial differential equation. The measurement processing is performed by a multi-dimensional integration, to obtain the posterior probability state distribution from the likelihood of the measurement and the prior probability distribution. This process is known under the name Bayesian inference. It is, however, immensely more computationally complex and memory intensive than the solution disclosed further below. In passing it can be mentioned that Bayesian inference is today approximated by so-called particle filters, in which the probability density functions are discretized in terms of individual "particles". Since particle filtering is still immensely more complex than the disclosed solution, the details are not discussed further in detail here.

At the other complexity extreme, each mode can be modeled separately and also estimated separately. Then ad hoc logic may be used to select the movement mode. Traditional kinematic state estimation for e.g. air vehicles was designed in that way. One movement mode was assumed to be constant velocity movement, i.e. straight-line movement, and the other movement mode was a maneuver mode, modeled by a leaky constant velocity movement that responded to measurements with much higher agility than the constant velocity mode. Finally, a maneuver detector was used to choose the maneuver filter in case that was deemed to match measurements better. After the maneuver was terminated a re-initialized constant velocity movement mode was used for kinematic state estimation. This approach was robust but suffered from difficulties in the selection of threshold values for the maneuver detector.

A more systematic approach to the kinematic state estimation problem at hand is offered by the interacting-multiple-model (IMM) filter that was discovered about 30 years ago.

The IMM algorithm assumes that the system behaves according to one of a finite number of models which is one of several modes. These models can differ in noise levels or their structure, such as different state dimensions and unknown inputs. In the IMM approach, at time k the state estimate is computed under each possible model using r filters, with each filter using a different combination of the previous model-conditioned estimates—mixed initial conditions.

Figure 2:
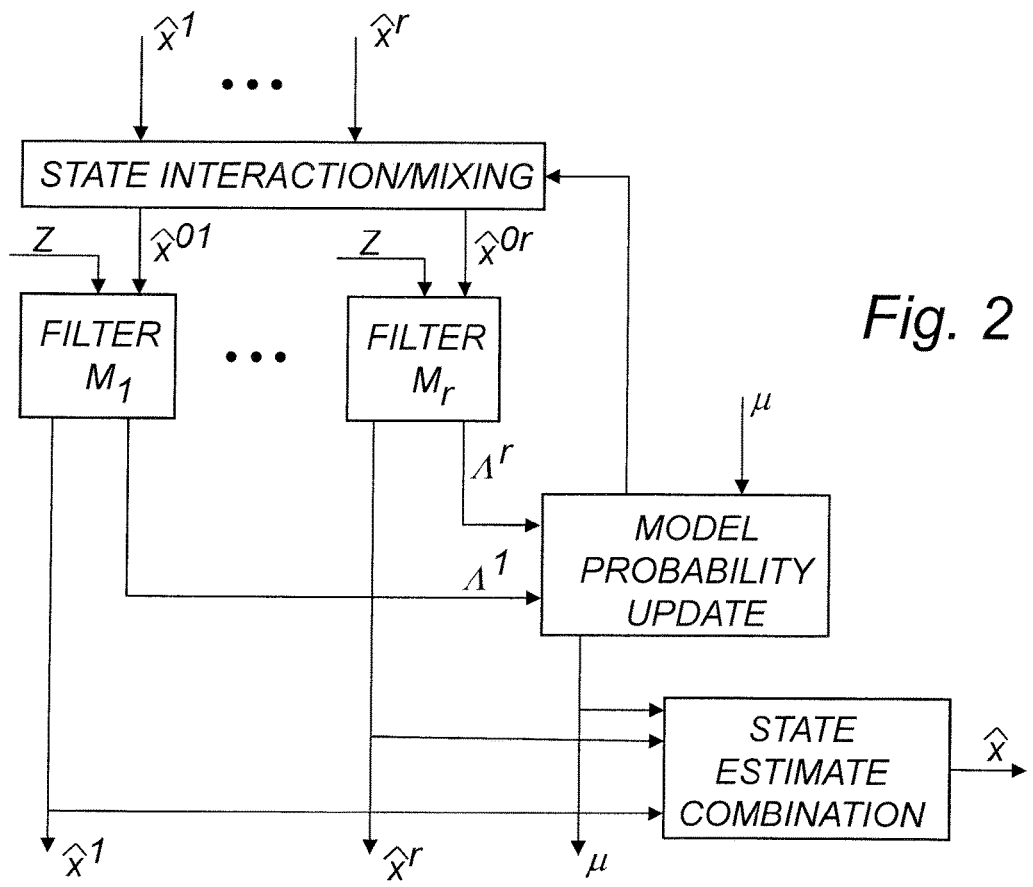
FIG. 2 is a block diagram of an interacting-multiple-model algorithm.

FIG. 2 describes one cycle of the typical IMM algorithm, which consists of r interacting filters operating in parallel. The IMM algorithm is described more in detail in Appendix C.

To set up an IMM filter, three main choices needed to be made. First, the movement modes have to be defined. Secondly, the transition probabilities between the movement modes have to be defined. Finally, the initial conditions of the filters have to be selected.

For each movement mode, this amount to the definition of a state space model, i.e., one vector difference equation that defines the dynamics, and another static vector equation that defines the measurement relation, by mapping states to the measurements. In addition, the inaccuracies of the measurement equation and the dynamic state model needs to be given in terms of the covariance matrices of the uncertainties.

The second choice describes, in terms of a hidden Markov model, how the modes interact, this being expressed in terms of the probabilities of a mode transition of the estimated object, between two discrete instances of time.

The third choice is typically made in terms of the expected initial state and covariance of each model.

All these choices are typically specific for the actual implementation of the IMM and are thus more or less unique for each new implementation.

For each filter $M_j$, j=1, . . . , r, a nonlinear Extended Kalman filter (EKF) is typically used. EKF is based on linear approximations of the nonlinear system. It can be used to estimate the state of a discrete-time dynamic system described by a vector difference equation with additive white Gaussian noise that models unpredictable disturbances.

Figure 3:
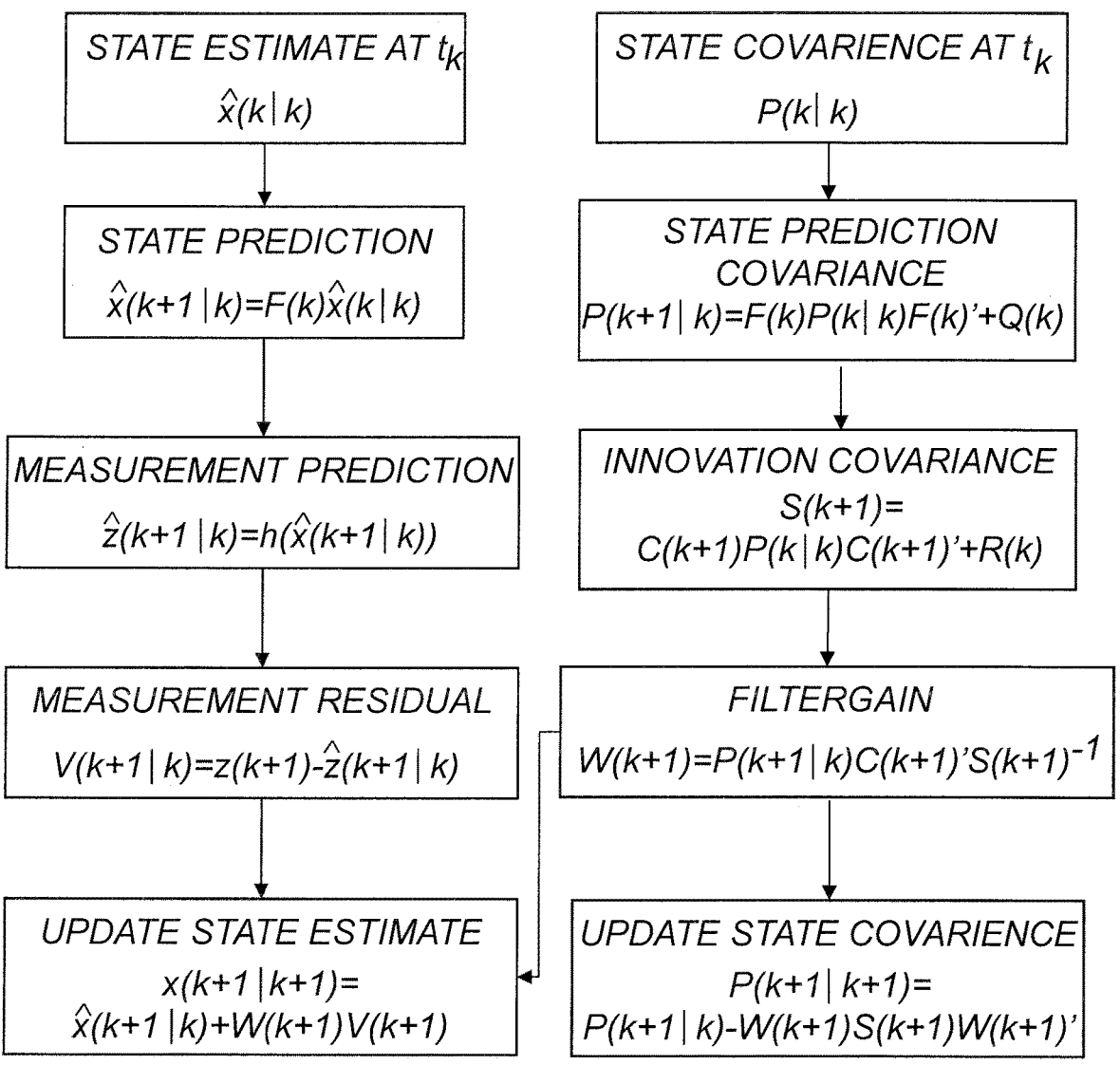
FIG. 3 illustrates one cycle in an Extended Kalman filter state estimation of a linear system with nonlinear measurement.

A flowchart of a typical EKF filter is shown in FIG. 3, and the EKF is described more in detail in Appendix D.

APPENDIX C

FIG. 2 describes one cycle of the typical IMM algorithm, which consists of r interacting filters operating in parallel. The mixing is done at the input of the filters, at the state interaction/mixing unit, with the probabilities, conditioned on data $Z^{k-1}$. The structure of the IMM algorithm is:

$$(N_e;N_f)=(r;r), \tag{C1}$$

where $N_e$ is the number of estimates at the start of the cycle of the algorithm and $N_f$ is the number of filters in the algorithm.

One cycle of the algorithm consists of the following. Mixing probabilities (i,j=1, . . . , r) are calculated. The probability that mode $M_i$ was in effect at time k−1 given that $M_j$ is in effect at k conditioned on $Z^{k-1}$ is:

$$\mu_{i|j} = \frac{1}{\bar{c}_j} p_{ij}\mu_i(k-1), \tag{C2}$$

where the normalizing constants are given by the below equation. This equation uses the mode transition probabilities $p_{i,j}$ which is the respective probability that the estimated object is in mode j at time k, conditioned on being in mode i at time k−1. The expression for the normalizing constant is:

$$\bar{c}_j = \sum_{i=1}^r p_{ij}\mu_i(k-1).$$

Next, mixing is performed for (j=1, . . . r). Starting with $\hat{x}^i(k-1|k-1)$ one components the mixed initial condition for the filter matched to $M_j(k)$ as:

$$\hat{x}^{0j}(k-1|k-1) = \sum_{i=1}^r \hat{x}^i(k-1|k-1)\mu_{i|j}(k-1|k-1)\, j = 1, \ldots, r.$$

The covariance corresponding to the above is:

$$P^{0j}(k-1|k-1) =$$
$$\sum_{i=1}^r \mu_{i|j}(k-1|k-1)\{P^i(k-1|k-1) + [\hat{x}^i(k-1|k-1) - \hat{x}^{0j}(k-1|k-1)]\cdot$$
$$[\hat{x}^i(k-1|k-1) - \hat{x}^{0j}(k-1|k-1)]'\},$$

with ' denoting the transpose.

Next, mode-matched filtering is performed for (j=1, . . . r). The estimate and the covariance obtained in eq. (5) are used as input to the filter matched to $M_j(k)$, which uses z(k) to yield $\hat{x}^j(k|k)$ and $P^j(k|k)$.

The likelihood function corresponding to the r filters:

$$\Lambda_j(k)=p[z(k)|M_j(k),Z^{k-1}] \tag{C6}$$

are computed using the mixed initial condition and the associated covariance as:

$$\Lambda_j(k)=p[z(k)|M_j(k),\hat{x}^{0j}(k-1|k-1)P^{0j}(k-1|k-1)]j=1, \ldots$$
$$,r. \tag{C7}$$

Model probability update is performed for (j=1, . . . , r). This is done as follows:

$$\mu_j(k) = \frac{1}{c}\Lambda_j(k)\bar{c}_j \;\; j = 1, \ldots, r, \tag{C8}$$

where $\bar{c}_j$ is given above and $$c = \sum_{j=1}^r \Lambda_j(k)\bar{c}_j \tag{C9}$$

is the normalization factor.

Estimate and covariance combination is performed. Combination of the model-conditioned estimates covariances is done according to the mixture equations:

$$\hat{x}(k|k) = \sum_{j=1}^{r} \hat{x}^j(k|k)\mu_j(k) \tag{C10}$$

$$P(k|k) = \sum_{j=1}^{r} \mu_j(k)\{P^j(k|k) + [\hat{x}^j(k|k) - \hat{x}(k|k)][\hat{x}^j(k|k) - \hat{x}(k|k)]'\}.$$

APPENDIX D

The dynamic model of the EKF is:

$$x(k+1)=F(k)x(k)+v(k), \tag{D1}$$

where x(k) is the $n_x$-dimensional state vector, and v(k), k=0, 1, . . . is the sequence of zero-mean white Gaussian process noise (also $n_x$ vectors) with covariance:

$$\mathbb{E}[v(k)v(k)']=Q(k). \tag{D2}$$

The measurement equation is:

$$z(k)=h(x(k),k)+w(k)k=1, \tag{D3}$$

with h(.) being a nonlinear function of state and w(k) the sequence of zero-mean Gaussian measurement noise with covariance:

$$\mathbb{E}[w(k)w(k)']=R(k). \tag{D4}$$

The matrices F, Q, R and the function h(.) are assumed to be known and possibly time varying. In other words, the system can be time varying and the noises nonstationary. The Jacobian of the measurement model h(x(k),k) with respect to k is defined as:

$$C(k) = \frac{\partial H(x(k), k)}{\partial x(k)}. \tag{D5}$$

The initial state x(0), in general unknown, is modeled as a random variable, Gaussian distributed with known mean and covariance. The two noise sequences and the initial state are assumed to be mutually independent. This constitutes the Linear-Gaussian (LG) assumption.

The conditional mean:

$$\hat{x}(j|k) = \mathbb{E}[x(j)|Z^k], \tag{D6}$$

where $Z^k=\{z(j),j\leq k\}$ denotes the sequence of observations available at time k, is the estimate of the state if j=k and predicted value of the state if j>k. The conditional covariance matrix of x(j) given the data $Z^k$ or the covariance associated with the estimate is:

$$P(j|k) = \mathbb{E}[[x(j)-\hat{x}(j|k)][x(j)-\hat{x}(j|k)]'|Z^k]. \tag{D7}$$

The estimation algorithm starts with the initial estimate $\hat{x}(0|0)$ of x(0) and the associated initial covariance P(0|0), assumed to be available. The second (conditioning) index 0 stands for $Z^0$, the initial information.

One cycle of the dynamic estimation algorithm—the Extended Kalman filter (EKF)—will thus consist of the computations to obtain the estimate:

$$\hat{x}(k|k) = \mathbb{E}[x(k)|Z^k] \tag{D8}$$

which is the conditional mean of the state at time k (the current stage) given the observation up to and including time k, and the associated covariance matrix:

$$P(k|k) = \mathbb{E}[[x(k)-\hat{x}(k|k)][x(k)-\hat{x}(k|k)]'|Z^k]. \tag{D9}$$

It remains to describe the propagation to the next update time. This is obtained by the equations:

$$\hat{x}(k+1|k)=A\hat{x}(k|k) \tag{D10}$$

$$P(k+1|k)=AP(k|k)A^T+Q(k). \tag{D11}$$

APPENDIX E

Figure 4:
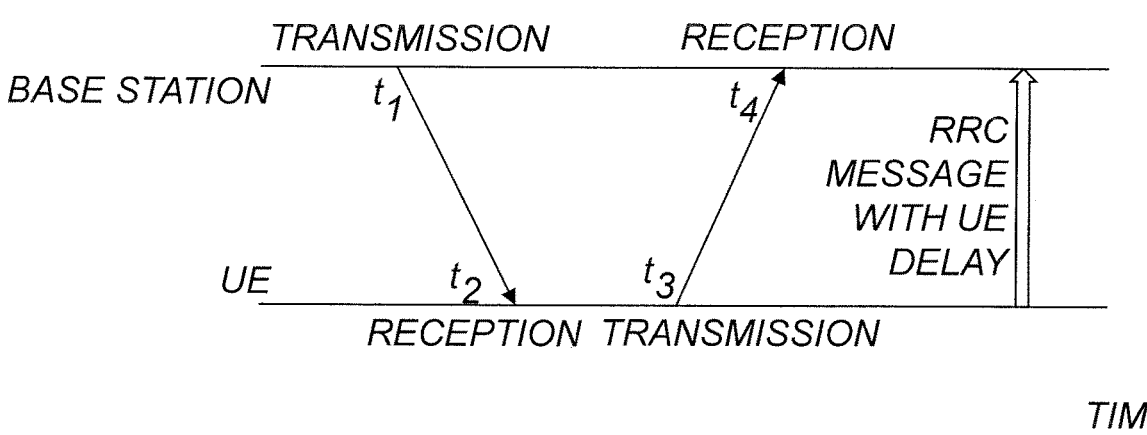
FIG. 4 illustrates the principle of a wideband code division multiple access (WCDMA) round-trip time measurement.

Given the round-trip time (RTT) measurement, the range follows as:

$$R = c\frac{RTT}{2}, \tag{E1}$$

where c denotes the speed of light. The principle of the RTT measurement is illustrated in FIG. 4. A base station transmits a signal at a time instant $t_1$. The signal propagates to the UE, which receives the signal at a time instant $t_2$. The UE replies with a reply signal, which is transmitted at a time instant $t_3$. The reply signal is received in the base station at a time instant $t_4$. The UE keeps track on the delay, UE RxTx, between the reception of the first signal and the transmission of the reply signal and signals this delay time to the base station, typically in a radio resource protocol (RRC) message. The UE RxTx is measured in the UE as:

$$UE\ RxTx=t_3-t_2 \tag{E2}$$

At the base station side, the true RTT time can then be obtained as:

$$RTT=t_4-t_1-UE\ RxTx. \tag{E3}$$

It can be noted that the main contribution of the inaccuracy of the measurement originates from the two reception processes in the UE and the base station. The theoretical inaccuracy of one such measurement is, in free space propagation, inversely proportional to the measurement bandwidth, as:

$$\Delta t \geq \frac{1}{4\pi}\frac{1}{\Delta f}. \tag{E4}$$

This means that in case the measurement bandwidth is for example 5 MHz, then the best time inaccuracy that is possible is 13 ns which corresponds to a little less than 5 m, corresponding to a 1 sigma value, i.e. equal to a standard deviation.

APPENDIX F

A model for the pathloss (used by Ericsson) is used as illustration here and it is related to the estimated state in the following measurement equation.

$$PL=\alpha_0+\alpha_1 \log_{10}(d)+\alpha_2 \log_{10}(h_{bs})+\alpha_3 \log_{10}(h_{bs})\log_{10}(d)-3.2(\log_{10}(11.75h_m))^2+44.49 \log_{10}(f)-4.78(\log_{10}(f))^2=f(d(\hat{x})). \tag{F1}$$

with $\alpha_0$, $\alpha_1$, $\alpha_2$, $\alpha_3$ are constants defined as in Table 1, $h_{bs}$ being the base station antenna height, $h_m$ being the mobile station antenna height, d is the distance between transmitter and receiver, defined as:

$$d(\hat{x})=\sqrt{(\hat{x}_1-x_{s,1})^2+(\hat{x}_2-x_{s,2})^2+(\hat{x}_3-x_{s,3})^2}. \tag{F2}$$

TABLE 1

| Parameter values of Ericsson pathloss model. | | | | |
|---|---|---|---|---|
| Type of terrain | $\alpha_0$ | $\alpha_1$ | $\alpha_2$ | $\alpha_3$ |
| Urban | 36.2 | 30.2 | −12 | 0.1 |
| Sub-urban | 43.2 | 68.93 | −12 | 0.1 |
| Rural | 45.95 | 100.6 | −12 | 0.1 |

Therefore, $$h(\hat{x}(k))=f(d(\hat{x}(k)))=\alpha_0+\alpha_1\log_{10}(\sqrt{(\hat{x}_1-x_{s,1})^2+(\hat{x}_2-x_{s,2})^2+(\hat{x}_3-x_{s,3})^2})+\alpha_2\log_{10}(h_{bs})+$$
$$\alpha_3\log_{10}(h_{bs})\log_{10}(\sqrt{(\hat{x}_1-x_{s,1})^2+(\hat{x}_2-x_{s,2})^2+(\hat{x}_3-x_{s,3})^2})-3.2(\log_{10}(11.75\hat{x}_3))^2+44.49\log_{10}(f)-4.78(\log_{10}(f))^2, \quad \text{(F3)}$$

the derivative of the measurement model is defined as:

$$\frac{\partial h(\hat{x}(k))}{\partial\hat{x}}=\frac{\partial f}{\partial d}\frac{\partial d}{\partial\hat{x}}(k)=$$

$$\left(\frac{(\alpha_1+\alpha_3\log_{10}(h_{bs}))(\hat{x}_1(k)-x_{s,1}(k))}{\ln(10)\left[(\hat{x}_1(k)-x_{s,1}(k))^2+(\hat{x}_2(k)-x_{s,2}(k))^2+(\hat{x}_3(k)-x_{s,3}(k))^2\right]} \quad \frac{(\alpha_1+\alpha_3\log_{10}(h_{bs}))(\hat{x}_2(k)-x_{s,2}(k))}{\ln(10)\left[(\hat{x}_1(k)-x_{s,1}(k))^2+(\hat{x}_2(k)-x_{s,2}(k))^2+(\hat{x}_3(k)-x_{s,3}(k))^2\right]} \quad \frac{(\alpha_1+\alpha_3\log_{10}(h_{bs}))(\hat{x}_3(k)-x_{s,3}(k))}{\ln(10)\left[(\hat{x}_1(k)-x_{s,1}(k))^2+(\hat{x}_2(k)-x_{s,2}(k))^2+(\hat{x}_3(k)-x_{s,3}(k))^2\right]}-2\cdot3.2\log_{10}(11.75\hat{x}_3)\frac{1}{\ln(10)\hat{x}_3}\right)' \quad \text{(F4)}$$

APPENDIX G

The following 3-mode model is believed to constitute a new combination of movement modes, adapted to the hovering movement that drones are capable of. The three models are a 3D constant velocity movement Wiener process, a 3D constant acceleration movement Wiener process, and a 3D constant position Wiener process. The notation "constant" allows for minor fluctuations, so that the first model really concerns an almost constant velocity movement, the second model really concerns an almost constant acceleration movement and the third model really concerns an almost hovering constant position movement.

The continuous time state space constant velocity model is described using the states:

$$x(t)=\begin{bmatrix}x_1\\x_2\\x_3\\\dot{x}_1\\\dot{x}_2\\\dot{x}_3\end{bmatrix}, \quad \text{(G1)}$$

where the subscript defines the Cartesian coordinate directions. The model is:

$$\dot{x}(t)=A_1x(t)+B_1\hat{v}(t), \quad \text{(G2)}$$

with

-continued $$A_1=\begin{bmatrix}0&0&0&1&0&0\\0&0&0&0&1&0\\0&0&0&0&0&1\\0&0&0&0&0&0\\0&0&0&0&0&0\\0&0&0&0&0&0\end{bmatrix}, \quad B_1=\begin{bmatrix}0&0&0\\0&0&0\\0&0&0\\1&0&0\\0&1&0\\0&0&1\end{bmatrix}. \quad \text{(G3)}$$

The process noise covariance matrix is:

$$Q_{c1}=\text{diag}([q_{11}q_{12}q_{13}]), \quad \text{(G4)}$$

where $q_{11}$, $q_{12}$ and $q_{13}$ are the process noise variances.

The continuous time state space constant acceleration model is defined using the states:

$$x(t)=\begin{bmatrix}x_1\\x_2\\x_3\\\dot{x}_1\\\dot{x}_2\\\dot{x}_3\\\ddot{x}_1\\\ddot{x}_2\\\ddot{x}_3\end{bmatrix}, \quad \text{(G5)}$$

where the subscript defines the Cartesian coordinate directions. The model is:

$$\dot{x}(t)=A_2x(t)+B_2\hat{v}(t) \quad \text{(G6)}$$

$$A_2=\begin{bmatrix}0&0&0&1&0&0&0&0&0\\0&0&0&0&1&0&0&0&0\\0&0&0&0&0&1&0&0&0\\0&0&0&0&0&0&1&0&0\\0&0&0&0&0&0&0&1&0\\0&0&0&0&0&0&0&0&1\\0&0&0&0&0&0&0&0&0\\0&0&0&0&0&0&0&0&0\\0&0&0&0&0&0&0&0&0\end{bmatrix}, \quad B_2=\begin{bmatrix}0&0&0\\0&0&0\\0&0&0\\0&0&0\\0&0&0\\0&0&0\\1&0&0\\0&1&0\\0&0&1\end{bmatrix}. \quad \text{(G7)}$$

The process noise covariance matrix is $Q_{c2}$.

The continuous time state space constant position hovering model is defined by the states:

$$x(t)=\begin{bmatrix}x_1\\x_2\\x_3\end{bmatrix}, \quad \text{(G8)}$$

where the subscript defines the Cartesian coordinate directions. The model is:

$$\dot{x}(t) = A_3 x(t) + B_3 \hat{v}(t) \tag{G9}$$

$$A_3 = \begin{bmatrix} 0 & 0 & 0 \\ 0 & 0 & 0 \\ 0 & 0 & 0 \end{bmatrix}, \quad B_3 = \begin{bmatrix} 1 & 0 & 0 \\ 0 & 1 & 0 \\ 0 & 0 & 0.001 \end{bmatrix}. \tag{G10}$$

The process noise covariance is $Q_{c3}$.

Another aspect of the preferred IMM filtering process, is related to the physics of the drone movement. When the drone is in constant velocity movement, it cannot stop immediately, it rather brakes. This means that the sequence of mode transitions is from mode 1, over mode 2, to mode 3. The direct mode transmission from mode 1 to mode 3 is forbidden. This is reflected by new constraints in the mode transition probability matrix of the IMM filter, namely in:

$$p_{ij} = \begin{bmatrix} p_{11} & p_{12} & p_{13} \\ p_{21} & p_{22} & p_{23} \\ p_{31} & p_{32} & p_{33} \end{bmatrix}. \tag{G11}$$

The new restrictions are selected as the following ones:

$$p_{13} \leq \varepsilon_{13}, \ p_{31} \leq \varepsilon_{31}. \tag{G12}$$

Here $\varepsilon_{13}$ and $\varepsilon_{31}$ are both much smaller than 1.

A nonlinear range measurement model may be used, based on an RTT measurement. The RTT based range measurement model is:

$$h(\hat{x}(t)) = \frac{\sqrt[2]{(\hat{x}_1(k) - x_{s,1}(k))^2 + (\hat{x}_2(k) - x_{s,2}(k))^2 + (\hat{x}_3(k) - x_{s,3}(k))^2}}{c}, \tag{G13}$$

where $x_s(.)$ denotes the site position and the constant c is the speed of the light. The derivative of the measurement model is defined as:

$$\frac{\partial h(\hat{x})(k)}{\partial \hat{x}} = \begin{pmatrix} \dfrac{2(\hat{x}_1(k) - x_{s,1}(k))}{\sqrt[2]{(\hat{x}_1(k) - x_{s,1}(k))^2 + (\hat{x}_2(k) - x_{s,2}(k))^2 + (\hat{x}_3(k) - x_{s,3}(k))^2}} \\ \dfrac{2(\hat{x}_2(k) - x_{s,2}(k))}{\sqrt[2]{(\hat{x}_1(k) - x_{s,1}(k))^2 + (\hat{x}_2(k) - x_{s,2}(k))^2 + (\hat{x}_3(k) - x_{s,3}(k))^2}} \\ \dfrac{2(\hat{x}_3(k) - x_{s,3}(k))}{\sqrt[2]{(\hat{x}_1(k) - x_{s,1}(k))^2 + (\hat{x}_2(k) - x_{s,2}(k))^2 + (\hat{x}_3(k) - x_{s,3}(k))^2}} \end{pmatrix}'. \tag{G14}$$

In this example it is assumed that the measurement is done with respect to one site, at the time of update. In an application, multiple measurements would appear as new rows. Note also that the Jacobian as given here is for the hovering mode. Obvious modifications appear for the constant velocity and constant acceleration models.

APPENDIX H

Models for calculation of the altitude above mean sea level of the ground will be useful to define the technology. A first example of such a system would be a complete geographical information system (GIS) that consist of ground altitude maps covering the region of the cellular system. A second example would be to use a configured ground altitude, for each antenna site of the cellular system. A third example would be to use a model of the ground altitude, valid in the interior of each cell of the cellular system, obtained by the method of [1] T. Wigren, "Wireless hybrid positioning based on surface modeling with polygon support", Proc. VTC 2018 Spring, Porto, Portugal, June, 2018.

ABBREVIATIONS

3GPP Third Generation Partnership Project
4G 4th Generation
ASIC Application Specific Integrated Circuits
BTS Base Transceiver Stations
CD Compact Disc
COTS Common Off-The-Shelf
CPE Customer Premises Equipment
CPU Central Processing Units
DSP Digital Signal Processors
DVD Digital Versatile Disc
EKF Extended Kalman Filter
eNB evolved Node B
FPGA Field Programmable Gate Arrays
GIS Geographical Information System
gNB new radio NodeB
HDD Hard Disk Drive
HW hardware
IIR Infinite Impulse Response
IMM interacting-multiple-model
I/O input/output
LEE Laptop Embedded Equipment
LME Laptop Mounted Equipment
LTE Long-Term Evolution
MEM memory units
NB Node B
ND Network Device
NFV Network Function Virtualization
NI Network Interfaces
NIC Network Interface Controller
NR New Radio OS Operating System
OSS Operations and Support System
PC Personal Computer
PDA Personal Digital Assistant
PLC Programmable Logic Controllers
PRB Physical Resource Block
PUCCH Physical Uplink Control Channel
PUSCH Physical Uplink Control Channel
RAM Random Access Memory
REG registers
RF Radio Frequency
ROM Read-Only Memory
RRU Remote Radio Units
RTT round-trip-time
SRS Sounding Reference Signal STA Station
SW software
TA timing advance
UE User Equipment
UMTS Universal Mobile Telecommunication System
USB Universal Serial Bus
VM Virtual Machine
VMM Virtual Machine Monitor
VNE Virtual Network Element
WCDMA Wideband Code Division Multiple Access
WNIC Wireless Network Interface Controller

REFERENCES

[1] T. Wigren, "Wireless hybrid positioning based on surface modeling with polygon support", Proc. VTC 2018 Spring, Porto, Portugal, June, 2018.
[2] T. M. Schmidl, D. C. Cox, "Robust frequency and timing synchronization for OFDM", *IEEE Trans. Wirel. Commun.*, vol. 45, no. 12, pp. 1613-1621, 1997.

The invention claimed is:

1. A method for providing motion information of a user equipment in a wireless communication system, wherein said method comprises the steps of:

initiating, in a first network node, a first Doppler shift measurement concerning said user equipment;

initiating, in said first network node, a transfer of requests for second Doppler shift measurement to at least one second network node concerning said user equipment;

obtaining, in said first network node, data representing said first Doppler shift measurement, obtaining, in said first network node, data representing said at least one second Doppler shift measurement;

determining an estimated motion, in more than one dimension, of said user equipment in dependence of at least said obtained data representing said first Doppler shift measurement and said obtained data representing said at least one second Doppler shift measurement, wherein the first Doppler shift measurement and the second Doppler shift measurement comprise range rates of the user equipment relative to the first network node and the second network node based on differences of doppler frequencies as measured by the first network node and the second network node and carrier frequencies, wherein the determining of the estimated motion of said user equipment comprises a user equipment frequency offset compensation; and initiating an increased number of scheduled resource blocks for uplink signaling from said user equipment;

whereby said requests comprise a request to measure over said increased number of resource blocks for uplink signaling from said user equipment.

2. The method according to claim 1, characterized in that said determining of an estimated motion comprises estimation of a kinematic state of said user equipment.

3. The method according to claim 1, characterized in that said scheduled resource blocks for uplink signaling from said user equipment are resource blocks for a physical uplink shared channel.

4. The method according to claim 1, characterized by the further step of:

initiating scheduling of resource blocks for uplink signaling from said user equipment in several subframes;

whereby said requests comprise a request to measure over said resource blocks for uplink signaling from said user equipment in said several subframes and to average the measurements.

5. The method according to claim 1, characterized by the further step of:

obtaining a signal-to-noise ratio for uplink signaling from said user equipment as measured by said at least one second network node;

whereby said step of initiating an increased number of scheduled resource blocks for uplink signaling from said user equipment or said step of initiating scheduling of resource blocks for uplink signaling from said user equipment in several subframes is performed in dependence of said signal-to-noise ratio.

6. The method according to claim 1, characterized in that said determining of an estimated motion comprises estimation of a kinematic state of said user equipment and in that said user equipment frequency offset compensation is performed by state vector augmentation.

7. The method according to claim 6, characterized in that said state vector augmentation comprises modelling of a user equipment frequency bias as a random process.

8. The method according to claim 1, characterized in that said determining of an estimated motion comprises estimation of a kinematic state of said user equipment and in that said user equipment frequency offset compensation is performed by difference formation.

9. The method according to claim 8, characterized in that said difference formation comprises formation of differences between said first Doppler shift measurement and respective said second Doppler shift measurements.

10. The method according to claim 1, characterized in that said data representing said at least one second Doppler shift measurement comprises at least an identity of the site where said second Doppler shift measurement was performed, the second Doppler shift measurement and a time tag for when said second Doppler shift measurement was made.

11. The method according to claim 10, characterized in that said data representing said at least one second Doppler shift measurement further comprises site position information and/or coordinate system details.

12. The method according to claim 1, characterized in that said network node is a base station.

13. A method for assisting in providing of motion information of a user equipment in a wireless communication system, wherein said method comprises the steps of:

obtaining, in a network node, a request for a Doppler shift measurement concerning said user equipment, where said user equipment is connected to another network node;

initiating, in said network node, a Doppler shift measurement concerning said user equipment according to said request;

obtaining, in said network node, a Doppler shift measurement made according to said request;

initiating a transferring of data representing said obtained Doppler shift measurement to the network node initiating said request, wherein the Doppler shift measurement comprise range rates of the user equipment relative to the network node and the other network node based on differences of doppler frequencies as measured by the network node and the other second network node and carrier frequencies, wherein the determining of the estimated motion of said user equipment comprises a user equipment frequency offset compensation, characterized in that said request comprises a request to measure over an increased number of resource blocks for uplink signaling from said user equipment, and in that said initiating of a Doppler shift measurement comprises initiating of a Doppler shift measurement over said increased number of scheduled resource blocks for uplink signaling from said user equipment.

14. The method according to claim 13, characterized in that said scheduled resource blocks for uplink signaling from said user equipment are resource blocks for a physical uplink shared channel.

15. The method according to claim 13, characterized in that said request comprises a request to measure over resource blocks for uplink signaling from said user equipment in said several subframes and to average the measurements, and in that said initiating of a Doppler shift measurement comprises initiating of a Doppler shift measurement over said resource blocks for uplink signaling from said user equipment in several subframes, and by the further step of:

averaging obtained Doppler shift measurements made over said resource blocks for uplink signaling from said user equipment in several subframes.

16. The method according to claim 13, characterized in that said data representing said at least one second Doppler shift measurement comprises at least an identity of the site where said second Doppler shift measurement was performed, the second Doppler shift measurement and a time tag for when said second Doppler shift measurement was made.

17. The method according to claim 16, characterized in that said data representing said at least one second Doppler shift measurement further comprises site position information and/or coordinate system details.

* * * * *